(12) United States Patent
Choi et al.

(10) Patent No.: US 9,840,227 B2
(45) Date of Patent: Dec. 12, 2017

(54) SEAT BELT RETRACTOR

(71) Applicant: ASHIMORI INDUSTRY CO., LTD., Osaka-shi, Osaka (JP)

(72) Inventors: Insu Choi, Settsu (JP); Eri Fujiwara, Settsu (JP); Jongrin Lee, Settsu (JP)

(73) Assignee: ASHIMORI INDUSTRY CO., LTD., Osaka-shi (JP)

( * ) Notice: Subject to any disclaimer, the term of this patent is extended or adjusted under 35 U.S.C. 154(b) by 0 days.

(21) Appl. No.: 15/161,374

(22) Filed: May 23, 2016

(65) Prior Publication Data
US 2016/0339867 A1  Nov. 24, 2016

(30) Foreign Application Priority Data

May 22, 2015  (JP) ................................. 2015-104618

(51) Int. Cl.
| B60R 22/46 | (2006.01) |
| B60R 22/405 | (2006.01) |
| B60R 22/34 | (2006.01) |

(52) U.S. Cl.
CPC .......... *B60R 22/46* (2013.01); *B60R 22/3416* (2013.01); *B60R 22/405* (2013.01); *B60R 2022/468* (2013.01)

(58) Field of Classification Search
CPC combination set(s) only.
See application file for complete search history.

(56) References Cited

U.S. PATENT DOCUMENTS

| 5,507,448 | A | * | 4/1996 | Park | B60R 22/405 242/383.1 |
| 5,687,926 | A | * | 11/1997 | Park | B60R 22/405 242/383.4 |
| 8,740,126 | B2 | * | 6/2014 | Tatsuma | B60R 22/405 242/383.1 |
| 9,199,605 | B2 | * | 12/2015 | Uchibori | B60R 22/38 |
| 9,539,980 | B2 | * | 1/2017 | Osada | B60R 22/405 |
| 2007/0145174 | A1 | * | 6/2007 | Takamatsu | B60R 22/4633 242/374 |
| 2007/0290091 | A1 | * | 12/2007 | Mori | B60R 22/405 242/383.1 |
| 2009/0057466 | A1 | * | 3/2009 | Choi | B60R 22/3413 242/377 |
| 2009/0057471 | A1 | * | 3/2009 | Hiramatsu | B60R 22/405 242/396.1 |

(Continued)

FOREIGN PATENT DOCUMENTS

JP  2012-232727 A  11/2012

*Primary Examiner* — Nicole T Verley
(74) *Attorney, Agent, or Firm* — Sughrue Mion, PLLC

(57) ABSTRACT

A seatbelt retractor that includes a locking mechanism to prevent rotation of a spool in an extracting direction, a ratchet gear 7 and a locking gear 30 that integrally rotate with the spool, a clutch 50 that moves a pawl 9 from a rest position to an engaging position with respect to the ratchet gear 7, a clutch biasing member that biases the clutch 50 in a retracting direction and in a extracting direction, and a connecting mechanism to connect the clutch 50 to the locking gear 30. When extraction of the webbing is locked, a direction of biasing to rotate of the clutch 50 is maintained in the extracting direction so that the amount of retraction of the webbing required to release the lock is reduced to achieve quick release of the lock.

6 Claims, 28 Drawing Sheets

(56) References Cited

U.S. PATENT DOCUMENTS

| | | | |
|---|---|---|---|
| 2009/0309345 A1* | 12/2009 | Specht | B60R 22/46 |
| | | | 280/801.1 |
| 2011/0127363 A1* | 6/2011 | Tatsuma | B60R 22/405 |
| | | | 242/383.2 |
| 2011/0174911 A1* | 7/2011 | Takamatsu | B60R 22/405 |
| | | | 242/383.2 |
| 2014/0224916 A1* | 8/2014 | Asako | B60R 22/36 |
| | | | 242/390 |

* cited by examiner

SEAT BELT RETRACTOR

BACKGROUND OF THE INVENTION

Field of the Invention

The present invention relates to a seatbelt retractor to retract a webbing of a seat belt onto a spool.

Related Background of the Invention

A vehicle such as an automobile is usually provided with a seatbelt apparatus having a retractor for protecting a passenger on a seat. The retractor includes a spool for allowing a webbing (seatbelt) to be extracted therefrom or retracted thereon and a locking mechanism to prevent rotation of the spool in an extracting direction of the webbing in response to an acceleration or inclination of the vehicle or an acceleration of extraction of the webbing (seatbelt) in an emergency (such as collision).

In an emergency, the retractor actuates the locking mechanism to lock (or prevent) extraction of the webbing from the spool so that the passenger wearing the webbing is restrained on a seat and is thus prevented from being thrown out of the seat.

This lock of extraction of the webbing is released by utilizing a function of the retractor that retracts the webbing by the spool when the locked webbing is loosened (i.e., when a force in the extracting direction is released) (refer to Patent Literature 1).

In other words, specifically, in an emergency, a clutch is connected to a locking gear integrally coupled to the spool (winding shaft of the webbing) of the seatbelt retractor (hereinafter simply referred to as retractor) while the spool is rotating in an extracting direction of the webbing. When the clutch rotates in the extracting direction of the webbing due to the connection, a pawl is moved in conjunction with the rotation of the clutch and engages with a ratchet gear integrally coupled to the spool. This prevents the spool (winding shaft) of the retractor from rotating in the extracting direction.

In order to release a lock state where the pawl engages the ratchet gear, the connection between the clutch and the locking gear is required to be released. More specifically, when the webbing is retracted, the spool rotates in the retracting direction of the webbing, and the clutch, which is biased by a return spring in the retracting direction, integrally rotates in the retracting direction of the webbing with the locking gear. In conjunction with this rotation of the clutch, the pawl is rotated in a direction to disengage from the ratchet gear (unengaging direction). The rotation of the clutch is stopped as the pawl returns to an initial position (rest position), and the spool then further retracts the webbing, making the locking gear rotate in the retracting direction of the webbing. Whereby the locking gear rotates relatively with respect to the clutch and releases the connection between the locking gear and the clutch. Thus, the amount of rotation of the spool from the beginning to the end of the unlocking operation of the locking mechanism is larger than the amount of rotation of the spool from the beginning to the end of the locking operation of the locking mechanism, correspondingly making it necessary to retract a longer length of the webbing.

As described above, in a conventional retractor, a quick unlocking operation of the locking mechanism is difficult. Thus, when retraction of the webbing necessary for releasing the connection between the clutch and the locking gear is difficult to execute, in such a case as when an end lock occurs, in which the spool is suddenly stopped due to completion of storage of whole amount of the webbing, the end lock causes the clutch to be connected to the locking gear and thus to prevent rotation of the spool in the extraction direction of the webbing, it is difficult to release the lock. Also, when the locking mechanism is unexpectedly actuated by acceleration of a vehicle or movement of a passenger in ordinary use, retraction of a large length of the webbing for releasing the lock of extraction of the webbing is time-consuming, so user sometimes feels to be troublesome to release the lock.

PRIOR ART

Patent Literature

Patent Literature 1: Japanese Patent Laid-Open No. 2012-232727

SUMMARY OF THE INVENTION

Problems to be Solved by Invention

The present invention has been made in view of the above described conventional problems, and its object is to release more quickly the lock of extraction of the webbing by retracting a smaller amount of the webbing than in the conventional retractor.

Means for Solving Problems

The first feature of present invention is a seatbelt retractor including a housing having a pair of side walls opposing each other, a spool rotatably housed between the pair of side walls and to which one end of a webbing is fixed, the spool being biased to rotate in a retracting direction of the webbing by a retractive biasing member and being rotatable in an extracting direction of the webbing due to extraction of the webbing, and a locking mechanism to prevent rotation of the spool in the extracting direction in response to an acceleration of a vehicle or an acceleration of extraction of the webbing in an emergency. The locking mechanism includes a ratchet gear provided at one end portion of the spool to integrally rotate with the spool, a pawl rotatably supported by one of the pair of side walls and being displaceable between an engaging position where the pawl is engaged with teeth of the ratchet gear and can prevent rotation of the spool in the extracting direction and a rest position where the pawl is disengaged from the ratchet gear and allows rotation of the spool in the extracting direction, the pawl rotating in an engaging direction to the engaging position and rotating in an unengaging direction to the rest position, a locking gear being non-rotatably and coaxially attached to the ratchet gear, thereby integrally rotating with the spool, a clutch arranged coaxially and relatively rotatable with the spool, and arranged, in an emergency of the vehicle, to rotate integrally with the locking gear rotating in the extracting direction to displace the pawl to the engaging position, and a connecting mechanism detecting an emergency of the vehicle to connect the clutch integrally and rotatably with the locking gear, wherein due to rotation of the spool in the extracting direction while the clutch is connected to the locking gear, the clutch is rotated in the extracting direction to displace the pawl to the engaging position to prevent the rotation of the spool in the extracting direction, and due to rotation of the spool in the retracting direction from a state where the pawl prevents the rotation of the spool in the extracting direction, the clutch is rotated in the retracting direction and the pawl returns to the rest position. The locking mechanism further includes a clutch biasing member biasing to rotate the clutch in the retracting direction when the pawl is in the rest position and biasing to rotate the clutch in the extracting direction when the pawl is in the engaging position, due to rotation of the spool in the extracting direction after the clutch and the locking gear are connected, a direction of biasing to rotate the clutch by the clutch biasing member is switched to the extracting direction, the connection between the clutch and the locking gear via the connecting mechanism is released by relative rotation of the ratchet gear in the retracting direction with respect to the clutch while the clutch biasing member is biasing to rotate the clutch in the extracting direction, and after the connection between the clutch and the locking gear is released, the direction of biasing to rotate the clutch by the clutch biasing member is switched to the retracting direction due to rotation of the spool in the retracting direction.

Also, the second feature of the present invention is a seatbelt retractor including a housing having a pair of side walls opposing each other, a spool rotatably housed between the pair of side walls and to which one end of a webbing is fixed, the spool being biased to rotate in a retracting direction of the webbing by a retractive biasing member and being rotatable in an extracting direction of the webbing due to extraction of the webbing, and a locking mechanism to prevent rotation of the spool in the extracting direction in response to an acceleration of a vehicle or an acceleration of extraction of the webbing in an emergency. The locking mechanism includes a ratchet gear provided at one end portion of the spool and integrally rotates with the spool, a pawl rotatably supported by one of the pair of side walls and being displaceable between an engaging position where the pawl is engaged with teeth of the ratchet gear and can prevent rotation of the spool in the extracting direction and a rest position where the pawl is disengaged from the ratchet gear and allows rotation of the spool in the extracting direction, the pawl rotating in an engaging direction to the engaging position and rotating in an unengaging direction to the rest position, a locking gear being non-rotatably and coaxially attached to the ratchet gear, thereby integrally rotating with the spool, a clutch arranged coaxially and relatively rotatable with the spool, and arranged, in an emergency of the vehicle, to rotate integrally with the locking gear rotating in the extracting direction to displace the pawl to the engaging position, and a connecting mechanism detecting an emergency of the vehicle to connect the clutch integrally and rotatably with the locking gear, wherein due to rotation of the spool in the extracting direction while the clutch is connected to the locking gear, the clutch is rotated in the extracting direction to displace the pawl to the engaging position to prevent the rotation of the spool in the extracting direction, and due to rotation of the spool in the retracting direction from a state where the pawl prevents the rotation of the spool in the extracting direction, the clutch is rotated in the retracting direction and the pawl returns to the rest position. The locking mechanism further includes a pawl biasing member biasing to rotate the pawl in the unengaging direction when the pawl is in the rest position and biasing to rotate the pawl in the engaging direction when the pawl is in the engaging position, due to rotation of the spool in the extracting direction after the clutch and the locking gear are connected, a direction of biasing to rotate the pawl by the pawl biasing member is switched to the engaging direction, the connection between the clutch and the locking gear via the connecting mechanism is released by relative rotation of the ratchet gear in the retracting direction with respect to the clutch while the pawl biasing member is biasing to rotate the pawl in the engaging direction, and after the connection between the clutch and the locking gear is released, the direction of biasing to rotate the pawl by the pawl biasing member is switched to the unengaging direction due to rotation of the spool in the retracting direction.

Advantages of Invention

According to the present invention, the lock of extraction of the webbing can be released more quickly by retracting a smaller amount of the webbing than in the conventional retractor.

DESCRIPTION OF THE PREFERRED EMBODIMENTS

As described above, the present invention is characterized that it enables to release more quickly the lock of extraction of the webbing (rotation of a spool in an extracting direction of the webbing) by retracting a smaller amount of a webbing than in the conventional retractor.

To this end, in the present invention, in the lock state, a return spring biases the clutch to rotate in the extracting direction of the webbing, and during an unlocking operation, in response to retraction of the webbing (rotation of the spool in the retracting direction of the webbing), the connection between the clutch and the locking gear is released and then the direction of biasing for rotation of the clutch by the return spring is switched from the extracting direction to the retracting direction of the webbing. This enables to release the connection between the clutch and the locking gear at an earlier stage of the unlocking operation.

An embodiment of a seatbelt retractor (hereinafter referred to as a retractor) of the present invention will now be described.

A retractor 100 of the embodiment is a webbing retracting device to retract a webbing 2 of a seatbelt and is provided in a vehicle seatbelt apparatus. The seatbelt apparatus having the retractor 100 is mounted on a vehicle and restrains a passenger on a seat by the webbing 2 (seatbelt).

(First Embodiment)

Figure 1:
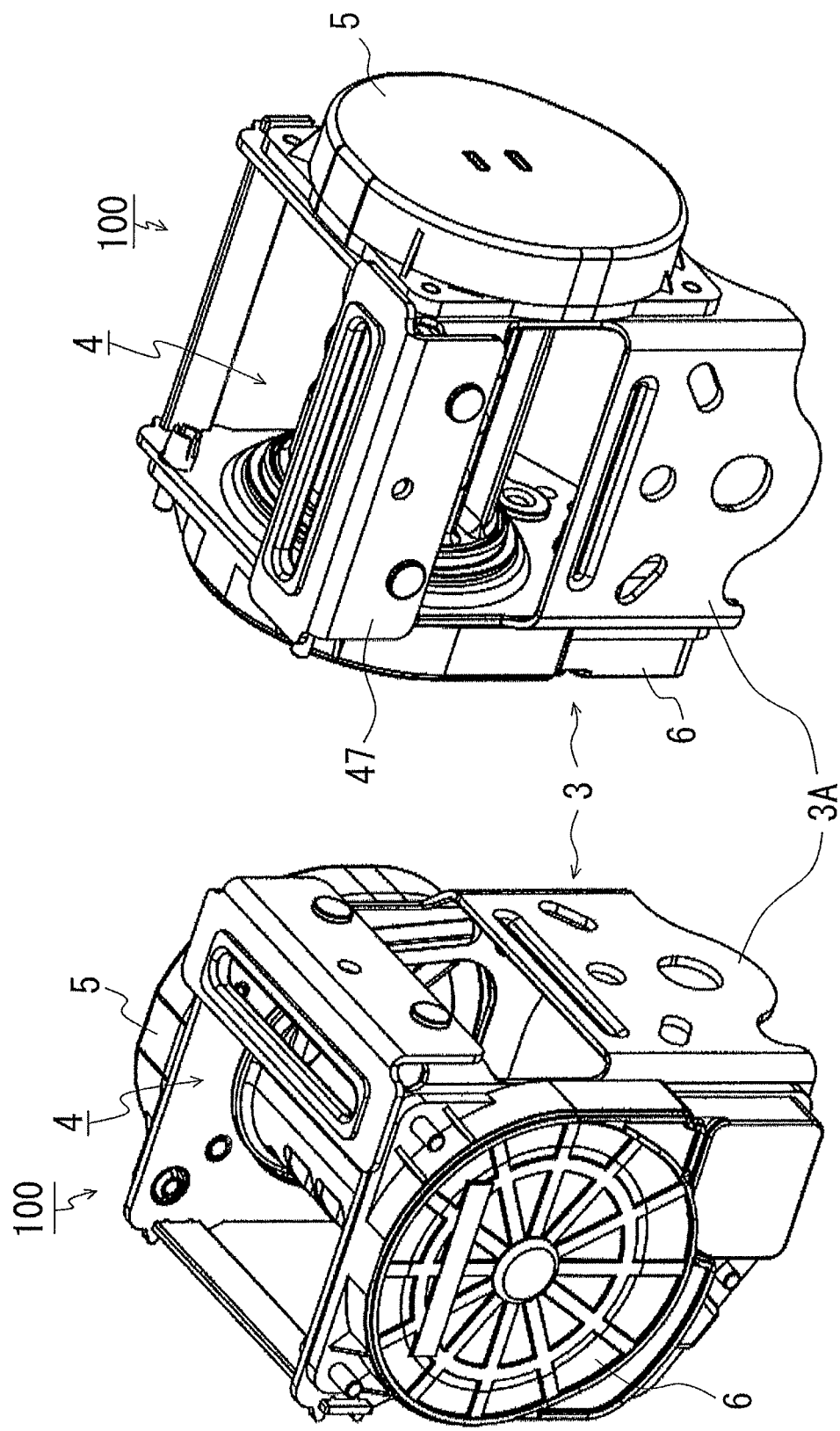
FIGS. 1A and 1B are perspective views of a retractor as a whole of a first embodiment as seen in different directions.

FIGS. 1A and 1B are perspective views of the retractor 100 of the first embodiment as seen in different directions.

Figure 2:
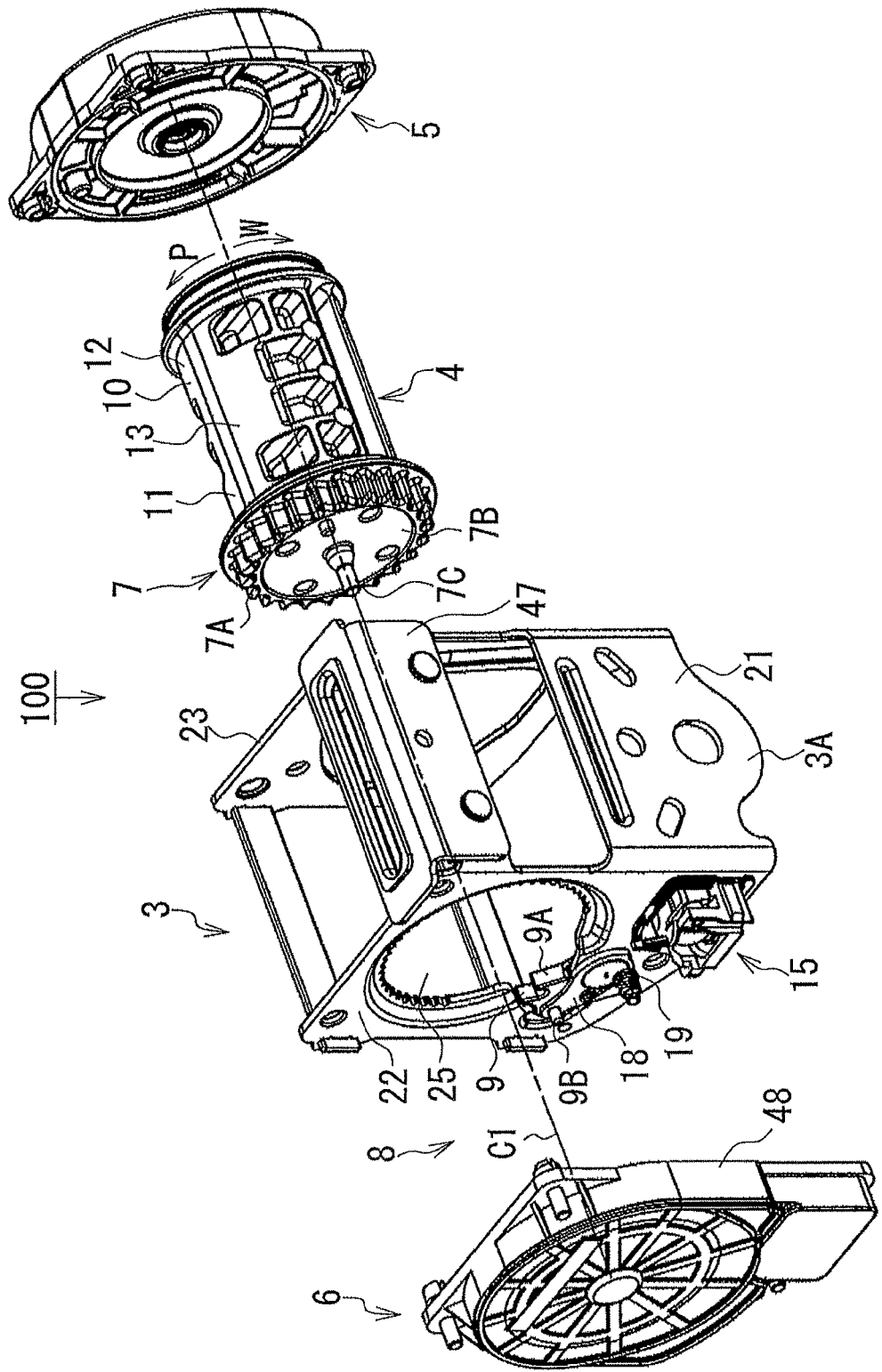
FIG. 2 is a perspective view of the retractor exploded into a plurality of units as seen in a different direction than FIG. 3.
Figure 3:
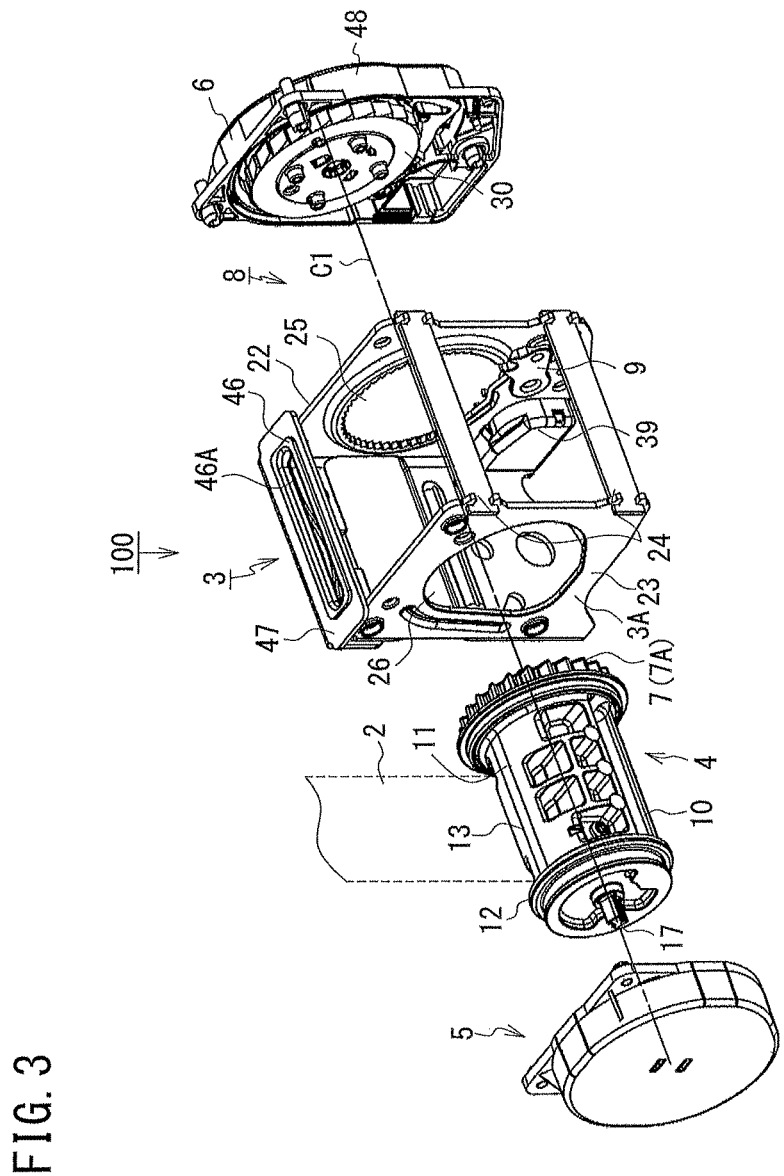
FIG. 3 is a perspective view of the retractor exploded into a plurality of units as seen in a different direction than FIG. 2.

Also, FIGS. 2 and 3 are perspective views of the retractor 100 exploded into a plurality of units as seen in mutually different directions.

As illustrated in FIGS. 1A and 1B, the retractor 100 includes a housing unit 3, a spool unit 4, a winding spring unit 5, and a locking unit 6.

As illustrated in FIGS. 2 and 3, the housing unit 3 includes a housing 3A, an acceleration sensor 15, a pawl 9 having an engaging claw 9A, and a return plate 18. The housing 3A stores a spool 10 and functions as an attaching portion for attaching the retractor 100 to a vehicle.

The spool unit 4 includes the spool 10 for retracting the webbing 2 and a ratchet gear 7, which is a component of a locking mechanism 8 described later. The spool 10 includes a pair of end portions 11 and 12 (a first end portion 11 and a second end portion 12) and a wind-up portion 13 between the first end portion 11 and the second end portion 12, and rotates about a center line C1. The webbing 2 is attached to and wound onto the wind-up portion 13.

The ratchet gear 7 has a plurality of teeth (ratchet teeth) 7A, and is provided at the first end portion 11 of the spool 10 so as to rotate and stop along with the spool 10.

The winding spring unit 5 includes a spiral spring 70 (FIGS. 7A and 7B) that biases the spool 10 in a webbing retracting direction, and constantly biases the spool 10 (spool unit 4) in a retracting direction W (FIG. 6) of the webbing 2 to retract the webbing 2 onto the spool 10. The webbing 2 is stored in the retractor 100 by being retracted onto the spool 10 rotating in the retracting direction W, and is extracted from the retractor 100 by rotating the spool 10 in an extracting direction P of the webbing 2.

The locking unit 6 includes a mechanism cover 48 as well as a locking gear 30 (FIG. 8A) and a clutch 50 described later and so on, which are stored within the mechanism cover 48. The locking unit 6 is adjacent to the ratchet gear 7 of the spool unit 4, and constitutes the locking mechanism 8 with the ratchet gear 7 for preventing rotation of the spool 10 in the extracting direction P.

The locking mechanism 8 actuates in accordance with (or in response to) an acceleration of extraction of the webbing 2 or an acceleration of a vehicle, and due to the engagement of (the engaging claw 9A of) the pawl 9 to the ratchet teeth 7A of the ratchet gear 7, prevents rotation of the ratchet gear 7 to prevent (lock) rotation of the spool unit 4 (spool 10).

The winding spring unit 5 and the locking unit 6 are fixed to a first side wall 22 and a second side wall 23 of the housing unit 3, respectively, and rotatably support the spool unit 4 housed within the housing unit 3 in the retracting direction W and the extracting direction P of the webbing.

Next, each of the above units of the retractor 100 will be described in detail.

"Housing Unit"

Figure 4:
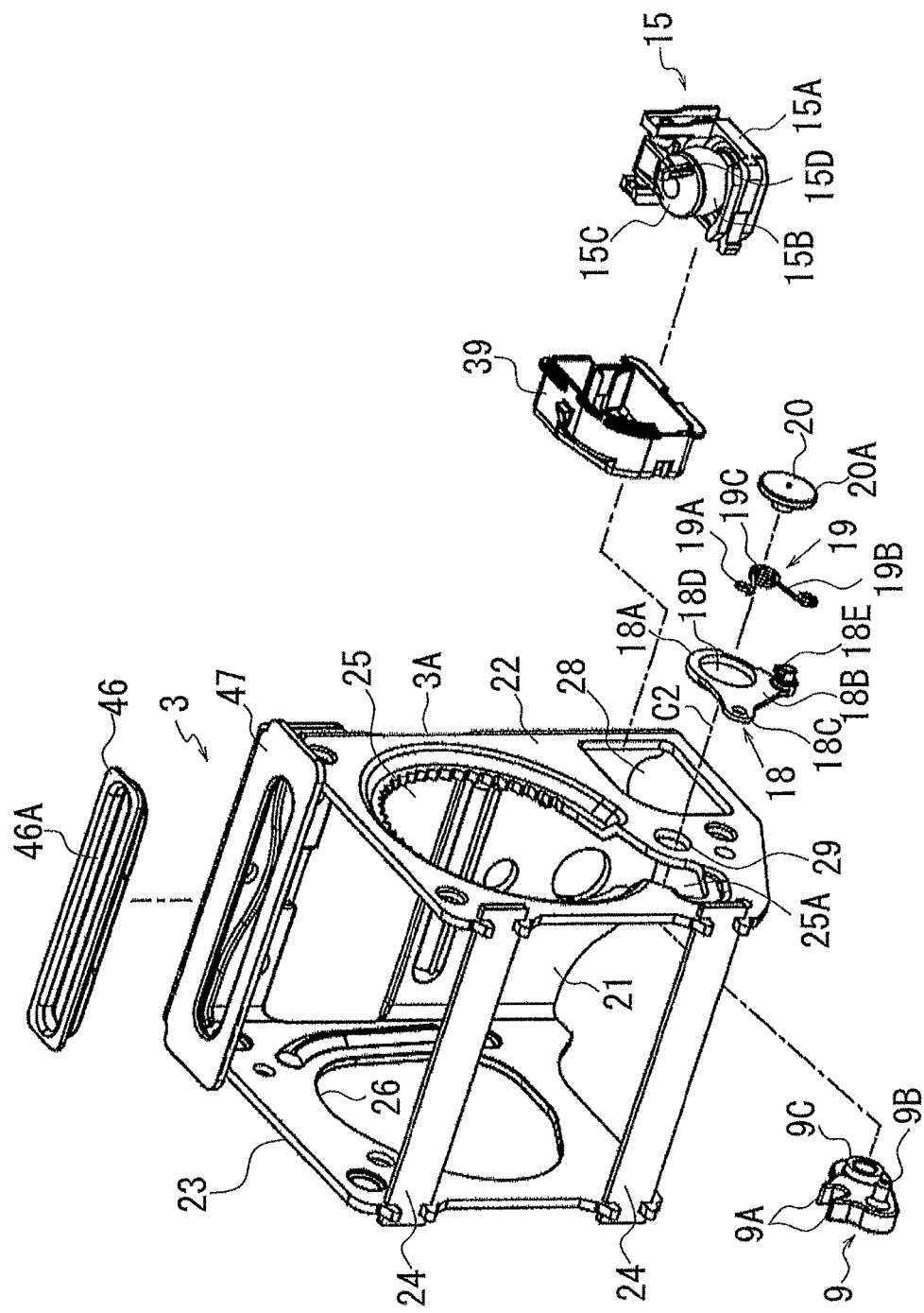
FIG. 4 is an exploded perspective view of a housing unit.

FIG. 4 is an exploded perspective view of the housing unit 3.

As illustrated in FIG. 4, the housing unit 3 includes the housing 3A storing the spool 10, a protector 46 for the webbing 2, the acceleration sensor 15, a sensor cover 39 covering the acceleration sensor 15, the pawl 9, a pawl rivet 20, a return spring 19, and the return plate 18.

"Housing"

The housing 3A includes a back wall 21 that is to be fixed to a vehicle, the side walls 22 and 23 (the first side wall 22 and the second side wall 23) at both side edges of the back wall 21, and two fixing plates 24 fixed between the side walls 22 and 23. The protector 46 includes a slot 46A through which the webbing 2 passes, and is attached to a bracket 47.

The housing 3A includes an opening (first opening 25) formed on the first side wall 22, a pawl storage portion 25A connected to the first opening 25, and an opening (second opening 26) formed on the second side wall 23. The ratchet gear 7 provided at the first end portion 11 of the spool 10 is arranged in the first opening 25 of the housing 3A. The second end portion 12 of the spool 10 is arranged in the second opening 26. The spool unit 4 (spool 10) is housed within the housing 3A.

"Pawl"

Figures 5A, 5B:
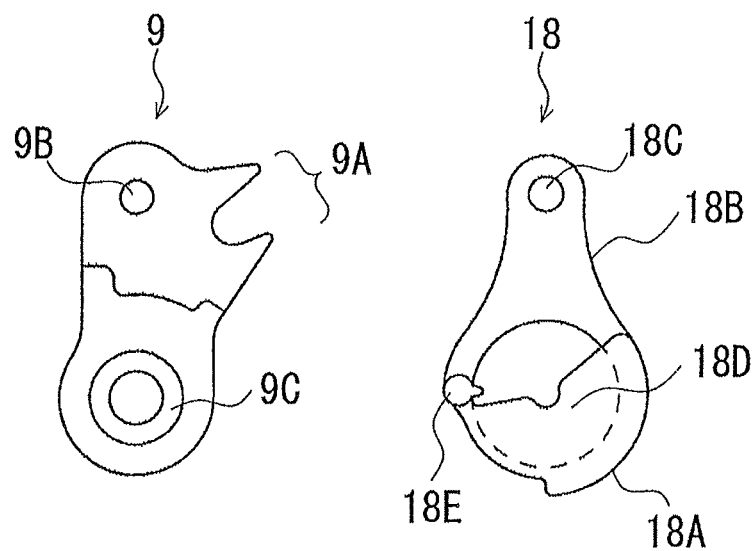
FIGS. 5A and 5B are views of a pawl and a return plate, respectively.

FIG. 4 illustrates the pawl 9 in a perspective view. Also, FIG. 5A is a front view of the pawl 9. The pawl 9 includes a pair of the engaging claws 9A that engage with the ratchet teeth 7A of the ratchet gear 7, an guide pin 9B formed at one end side of the pawl 9 near the engaging claws 9A, and a cylindrical boss 9C formed at the other end side of the pawl 9 far from the engaging claws 9A.

The guide pin 9B is inserted into a through hole 18C of the return plate 18 described later as well as into a guide groove 56 (FIG. 9A) of the clutch 50 described later. Also, as illustrated in FIG. 4, the boss 9C is inserted into a mounting hole 29 of the first side wall 22 from the inner side of the housing 3A, and a front end of the pawl rivet 20 is press-fitted into a mounting hole of the boss 9C from the outer side of the first side wall 22 of the housing 3A. This enables the pawl 9 to be attached so as to be rotatable about the boss 9C inserted into the first side wall 22.

Figure 6:
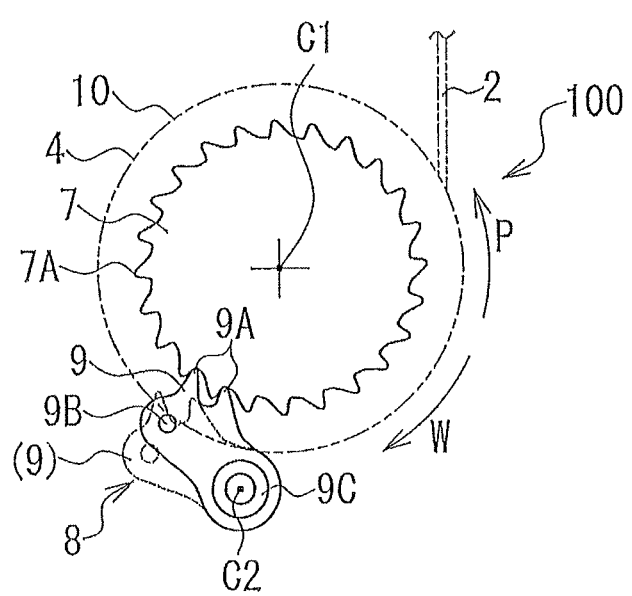
FIG. 6 is a front view illustrating the pawl and a ratchet gear.

FIG. 6 is a front view illustrating the pawl 9 and the ratchet gear 7. In this drawing, the pawl 9 that has been rotated to an engaging position is illustrated with a solid line, and the pawl 9 that has been rotated to a rest position is illustrated with a dotted line.

As the locking mechanism 8 actuates and the clutch 50 rotates in the extracting direction P of the webbing 2 around the center line C1 as described later, the pawl 9 is forcibly guided so as to rotate about a center line C2 (boss 9C) from the rest position where the engaging claw 9A does not engage with the ratchet teeth 7A, to the engaging position where the engaging claw 9A engages with the ratchet teeth 7A.

"Return Spring"

Referring back to FIG. 4, the return spring 19 is a torsional coil spring and includes a first arm portion 19A and a second arm portion 19B provided at both sides of a connecting spring portion 19C so as to form a substantial V-shape as seen in a front view. The first arm portion 19A is attached to an attaching pin 59 (FIG. 9B) vertically provided on the outer side of the clutch 50 as described later, and the second arm portion 19B is attached to an attaching pin 18E of the return plate 18.

As the relative angle between the first arm portion 19A and the second arm portion 19B of the return spring 19 is changed in a circumferential direction of the connecting spring portion 19C, the connecting spring portion 19C is elastically and torsionally deformed in a coiled direction.

"Return Plate"

As illustrated in FIG. 5B, the return plate 18 includes a circular plate 18A and a substantially triangular arm portion 18B extending from the circular plate 18A. A mounting hole 18D is provided concentrically on the circular plate 18A, and the through hole 18C into which the guide pin 9B of the pawl 9 is inserted is provided at a tip portion of the arm portion 18B. Also, the attaching pin 18E to which the second arm portion 19B of the return spring 19 is attached is vertically provided on a circumferential portion of the circular plate 18A.

The return plate 18 is assembled so as to be rotatable with the pawl 9 by inserting the guide pin 9B of the pawl 9 into the through hole 18C and fitting a head portion 20A of the pawl rivet 20 into the mounting hole 18D.

"Acceleration Sensor"

The acceleration sensor 15 is an emergency locking actuating device to actuate the locking mechanism 8 by detecting an acceleration of a vehicle in an emergency of the vehicle and, as illustrated in FIG. 4, includes a sensor holder 15A, an inertia mass 15B, and a sensor lever 15C. The inertia mass 15B is a metal sphere arranged in a concave portion of the sensor holder 15A and is movably supported between the sensor holder 15A and the sensor lever 15C. The sensor lever 15C covers the inertia mass 15B from above and is attached to the sensor holder 15A so as to be movable in a vertical direction.

The acceleration sensor 15 is inserted into the sensor cover 39, and the sensor holder 15A is attached to the sensor cover 39. The sensor cover 39 is attached to the first side wall 22 of the housing 3A by being inserted into a mounting hole 28 of the first side wall 22. In this arrangement, a lock claw 15D of the sensor lever 15C projects upward and is located outside of the sensor cover 39.

Figure 30:
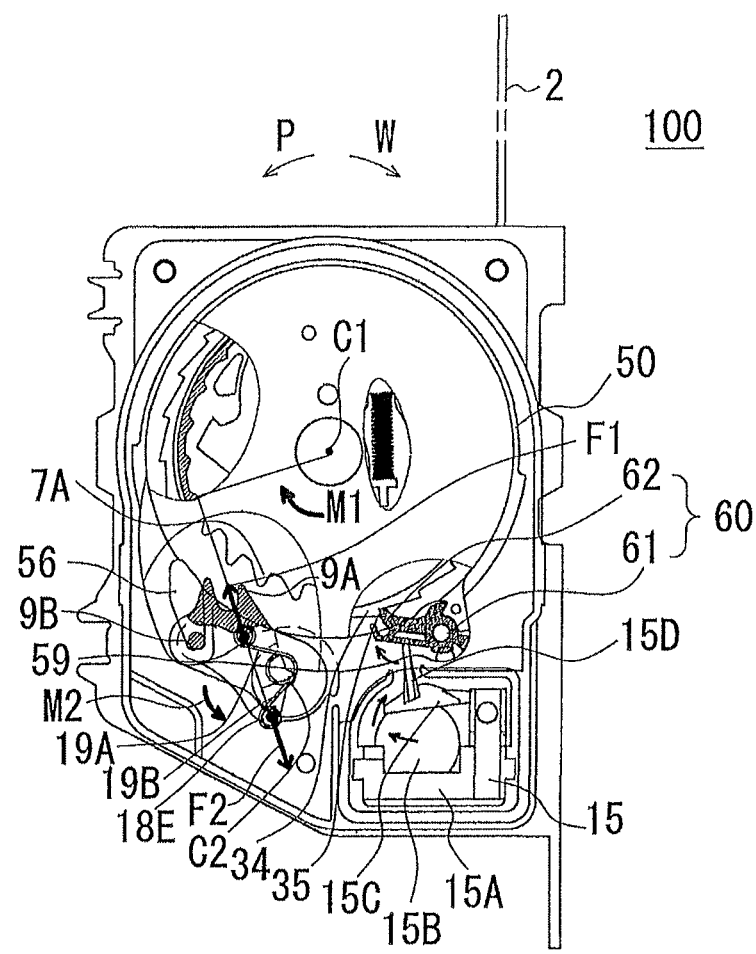
FIG. 30 is a fragmentary cross-sectional view of a variation of the retractor of the first embodiment in an unlock state.

When an acceleration of a vehicle exceeds a predetermined value in an emergency of the vehicle (such as collision and sudden braking), the inertia mass 15B moves on the sensor holder 15A due to an inertia force and pushes the sensor lever 15C upward in the drawing (see FIG. 30). In other words, the acceleration sensor 15 detects the acceleration of the vehicle by movement of the inertia mass 15B and moves the lock claw 15D of the sensor lever 15C upward so as to push a meshing pawl 60 (FIG. 30), which is rotatably attached to the clutch 50 as described later, upward to mesh the meshing pawl 60 with teeth 34 of a ratchet wheel 35.

Besides, due to the meshing of the meshing pawl 60 with the teeth 34 of the ratchet wheel 35, the locking gear 30 and the clutch 50 are connected.

"Ratchet Gear"

Figure 8A:
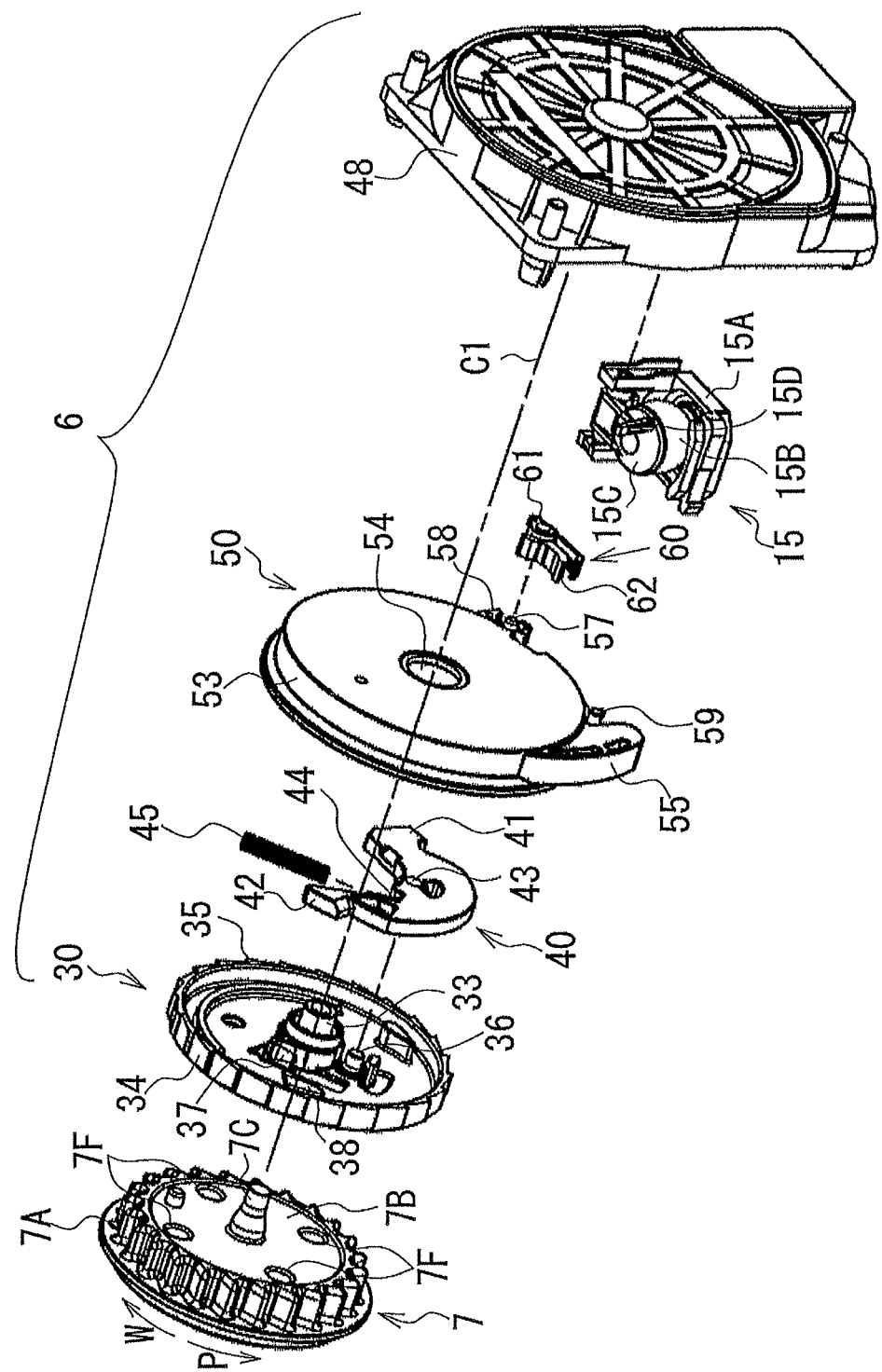
FIG. 8A is an exploded perspective view of a locking unit and the ratchet gear constituting a locking mechanism as seen in a different direction than FIG. 9A.

As illustrated in FIGS. 2 and 8A, the ratchet gear 7 includes the ratchet teeth 7A, a ratchet base 7B, and a shaft portion (ratchet shaft portion) 7C formed at a center of the ratchet base 7B. The plurality of ratchet teeth 7A is formed on an entire outer periphery of the ratchet gear 7.

In an emergency of a vehicle, in response to an acceleration of the vehicle or an acceleration of extraction of the webbing 2, the clutch 50 rotates in the extracting direction P in conjunction with extraction of the webbing 2, as described later. Due to the rotation of the clutch 50 in the extracting direction P, the pawl 9 moves (rotates) to the engaging position and the engaging claw 9A of the pawl 9 engages with the ratchet teeth 7A of the ratchet gear 7. This locks rotation of the ratchet gear 7, preventing rotation of the ratchet gear 7 (spool unit 4) in the extracting direction P.

Besides, the pawl 9 engages with the ratchet gear 7 only when the ratchet gear 7 rotates in the extracting direction P, and the ratchet teeth 7A of the ratchet gear 7 and the engaging claws 9A of the pawl 9 prevent rotation of the ratchet gear 7 only in the extracting direction P. When the engaging claw 9A disengages from the ratchet teeth 7A, the engagement between the pawl 9 and the ratchet gear 7 is released.

"Winding Spring Unit"

Figures 7A, 7B:
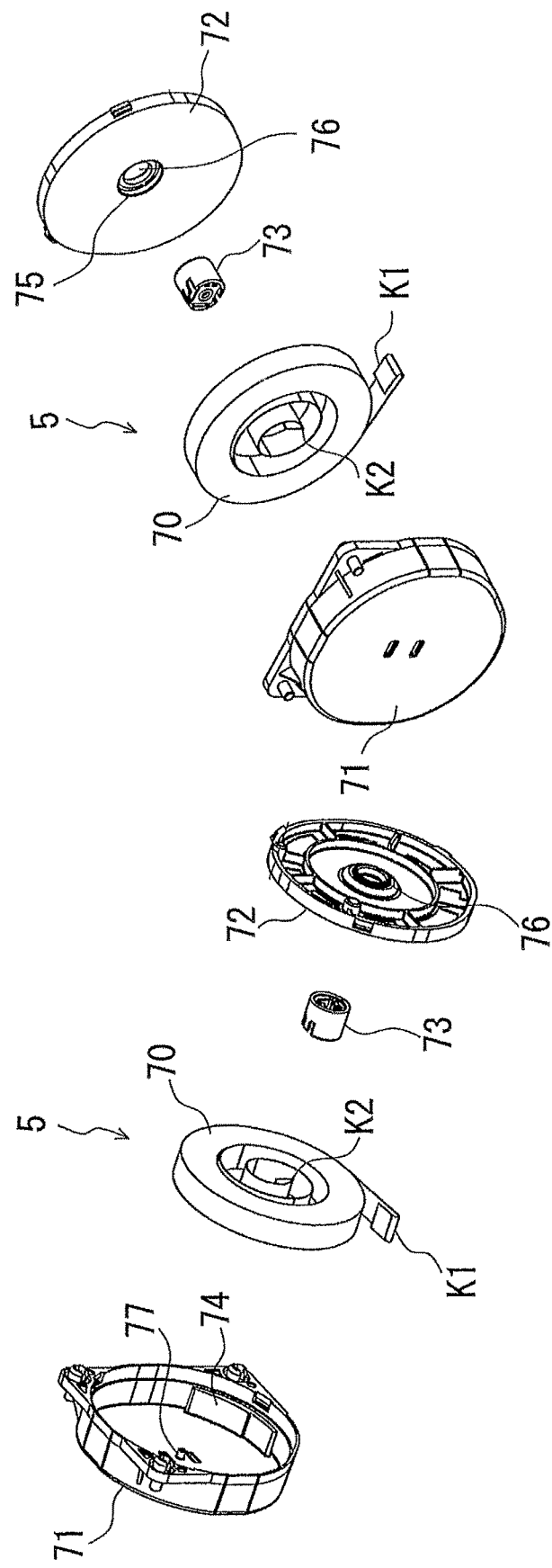
FIGS. 7A and 7B are exploded perspective views illustrating a winding spring unit as seen in different directions.

FIGS. 7A and 7B are exploded perspective views of the winding spring unit 5 as seen in different directions.

The winding spring unit 5 includes the spiral spring 70, a spring case 71, a spring seat 72, and a cylindrical spring shaft 73. An external end K1 of the spiral spring 70 is fixed to a fixing portion 74 of the spring case 71, and an internal end K2 of the spiral spring 70 is fixed to the spring shaft 73. The spring case 71 stores the spiral spring 70 and the spring shaft 73.

The spring seat 72 is attached to the spring case 71 and covers the spiral spring 70 and the spring shaft 73 in the spring case 71. Also, the spring seat 72 has a circular concave portion 75 formed at a center thereof and a bearing hole 76 formed at a center of the concave portion 75. One end portion of the spring shaft 73 is located in the concave portion 75 of the spring seat 72 and is rotatably supported by the spring seat 72. The other end portion of the spring shaft 73 is rotatably supported by a pin 77 of the spring case 71.

A shaft 17 of the spool 10 inserted into the bearing hole 76 is fixed to the spring shaft 73, and the spring seat 72 rotatably supports the shaft 17.

The spring shaft 73 rotates integrally with the spool 10 and transmits a biasing force of the spiral spring 70 in the retracting direction W to the spool 10.

Besides, the spiral spring 70 of the winding spring unit 5 corresponds to the retractive biasing member of the present invention.

With the above arrangement, the winding spring unit 5 constantly biases the spool 10 in the retracting direction W of the webbing 2 by the spiral spring 70. When the webbing 2 is extracted, the spiral spring 70 is wound due to the rotation of the spool 10 in the extracting direction P. When the webbing 2 is retracted, the spool 10 rotates in the retracting direction W due to the biasing force of the spiral spring 70 and the webbing 2 is wound onto the spool 10.

"Locking Unit"

Figure 9A:
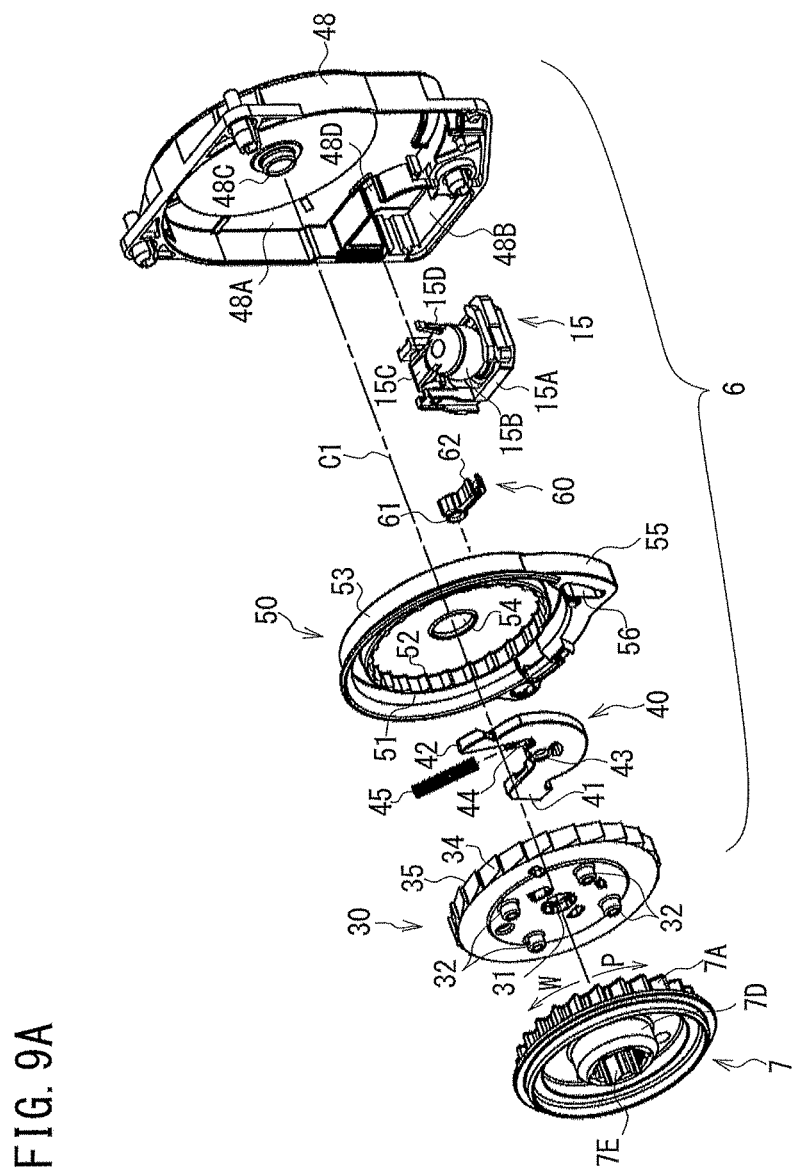
FIG. 9A is an exploded perspective view of the locking unit and the ratchet gear constituting the locking mechanism as seen in a different direction than FIG. 8A.
Figure 9B:
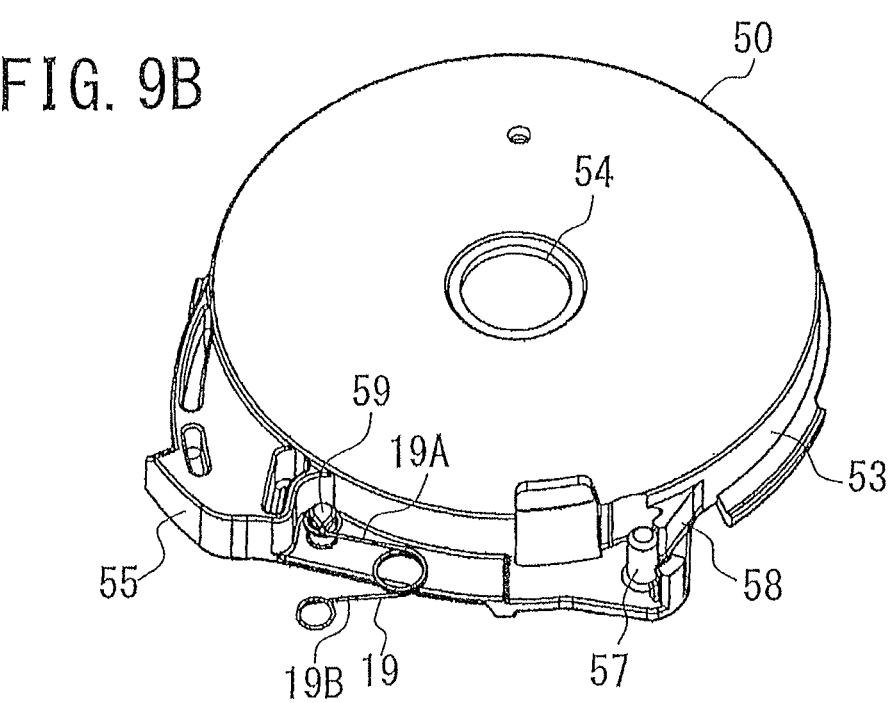
FIG. 9B is a perspective view of a clutch as seen in a different direction than FIG. 9A.

FIGS. 8A and 9A are exploded perspective views of the locking unit 6 and the ratchet gear 7 constituting the locking mechanism 8 as seen in mutually different directions. FIG. 9B is a perspective view of the clutch 50.

The locking unit 6 includes the mechanism cover 48, the locking gear 30, a locking arm 40, a sensor spring 45, the clutch 50, and the meshing pawl 60 and is provided on the first side wall 22 of the housing 3A.

"Mechanism Cover"

As illustrated in FIG. 9A, the mechanism cover 48 includes a first housing portion 48A for storing, the locking gear 30, the locking arm 40, the clutch 50 and so on, a second housing portion 48B for storing the acceleration sensor 15, and a cylindrical bearing boss 48C.

The lock claw 15D of the sensor lever 15C of the acceleration sensor 15 is located in a through hole 48D of the second housing portion 48B and projects into the first housing portion 48A through the through hole 48D.

"Locking Gear"

Figure 8B:
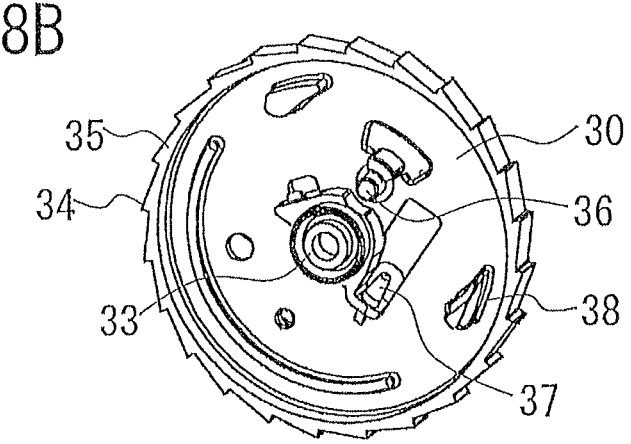
FIG. 8B is a perspective view of a locking gear as seen in a different direction than FIG. 8A.

FIG. 8B is a perspective view of the locking gear 30.

The locking gear 30 includes a shaft hole 31 (FIG. 9A) formed at a center thereof, a plurality of projections 32 (FIG. 9A) that fits into a plurality of concave portions 7F (FIG. 8A) of the ratchet gear 7, a shaft portion (gear shaft portion) 33 projecting from the center thereof, and the ratchet wheel 35, which is an annular member formed on an outer circumference of the locking gear 30 and has a plurality of the teeth 34 on an entire outer circumference of the ratchet wheel 35.

The locking gear 30 includes a cylindrical arm (locking arm 40) support portion 36 (FIG. 8A), a support pin 37 to support the sensor spring 45, and a stopper 38 to limit rotation of the locking arm 40 described later.

The ratchet shaft portion 7C of the ratchet gear 7 is inserted into the shaft hole 31 (FIG. 9A) of the locking gear 30, and a plurality of the projections 32 of the locking gear 30 fits into a plurality of the concave portions 7F of the ratchet gear 7. This enables the locking gear 30 to be attached to the ratchet gear 7 and to rotate integrally with the spool unit 4 (spool 10).

On the other hand, the gear shaft portion 33 of the locking gear 30 is inserted into and rotatably supported by the bearing boss 48C of the mechanism cover 48.

"Locking Arm"

As illustrated in FIGS. 8A and 9A, the locking arm 40 includes an insertion hole 43 provided between one end portion 41 and the other end portion 42 thereof in a curved longitudinal direction and a support pin 44 to support the sensor spring 45. The locking arm 40 is connected to the locking gear 30 at the inner side of the ratchet wheel 35 so as to be rotatable about the arm support portion 36 by inserting the arm support portion 36 of the locking gear 30 into the insertion hole 43.

Figure 11:
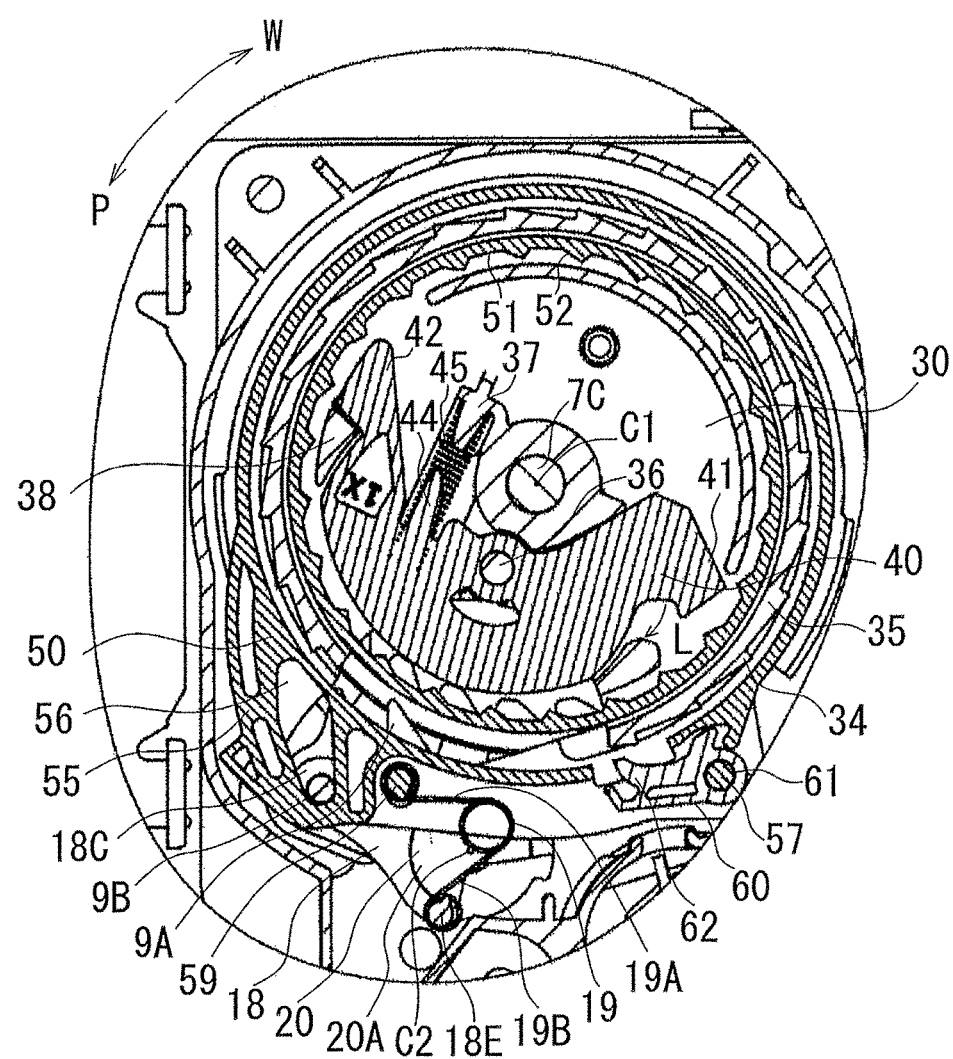
FIG. 11 is a cross-sectional view of the locking mechanism of the first embodiment in an unlock state.

The sensor spring 45 is provided between the support pin 44 of the locking arm 40 and the support pin 37 of the locking gear 30 and biases the other end portion 42 of the locking arm 40 in a reverse direction of a lock actuating direction (FIG. 11, the direction indicated with an arrow L). The other end portion 42 of the locking arm 40 rotates due to the biasing force of the sensor spring 45 and stops as it abuts on the stopper 38 (FIG. 11) of the locking gear 30.

"Clutch"

As illustrated in FIGS. 8A and 9A, the clutch 50 is stored in the first housing portion 48A so as to be rotatable in a predetermined rotation range while being sandwiched between the locking gear 30 and the mechanism cover 48.

As illustrated in FIG. 9A, the clutch 50 includes an annular inner wall 51, a clutch gear 52 formed on an inner circumference of the inner wall 51, an annular outer wall 53 surrounding the inner wall 51, and a center hole 54 located at a center of the inner wall 51. The gear shaft portion 33 (FIG. 8A) of the locking gear 30 is inserted into the center hole 54, and the locking gear 30 and the spool unit 4 are arranged so as to be relatively rotatable with respect to the clutch 50. As the lock actuates, the one end portion 41 of the locking arm 40 engages with the engaging teeth of the clutch gear 52.

Due to the engagement of the one end portion 41 of the locking arm 40 with the engaging teeth of the clutch gear 52, the clutch 50 rotates in the extracting direction P integrally with the locking gear 30 that rotates in the extracting direction P of the webbing.

Provided on the outer side of the annular outer wall 53 of the clutch 50 is a guide portion 55, the guide groove 56 formed in the guide portion 55 in an elongated shape, a cylindrical meshing pawl support portion 57 (FIG. 9B) to support the meshing pawl 60, a stopper 58 on which the meshing pawl 60 abuts, and the attaching pin 59 (FIG. 9B) that is provided between the guide groove 56 and the meshing pawl support portion 57 and to which the first arm portion 19A of the return spring 19 is attached.

The guide pin 9B of the pawl 9 is inserted into the guide groove 56 and is guided (forcibly moved) by the guide groove 56 due to rotation of the clutch 50 as described later.

This enables the clutch 50 and the pawl 9 to rotate in conjunction with each other: that is, when the clutch 50 rotates in the extracting direction P, the pawl 9 rotates in a direction to engage with the ratchet gear 7 (engaging direction), and when the clutch 50 rotates in the retracting direction W, the pawl 9 rotates in a direction to disengage from the ratchet gear 7 (unengaging direction). In other words, the clutch 50 rotates in conjunction with the pawl 9 between a first position, where the pawl 9 is in the rest position, and a second position, where the pawl 9 is in the engaging position.

"Meshing Pawl"

As illustrated in FIGS. 8A and 9A, the meshing pawl 60 includes a cylindrical attaching portion 61 rotatably supported by the meshing pawl support portion 57 of the clutch 50 and a meshing claw 62 to mesh with the teeth 34 of the ratchet wheel 35.

When the meshing pawl 60 rotates due to its own weight, the meshing pawl 60 abuts on the stopper 58 of the clutch 50 and is stopped.

As already described with respect to the acceleration sensor 15, when an acceleration of a vehicle exceeds a predetermined value, the meshing pawl 60 is pushed upward by the lock claw 15D, which is pushed by the inertia mass 15B to move upward, and rotates about the attaching portion 61. Due to this rotation, the meshing claw 62 of the meshing pawl 60 meshes with the teeth 34 of the ratchet wheel 35, and the clutch 50 and the locking gear 30 are connected.

"Spool Unit"

Figure 10:
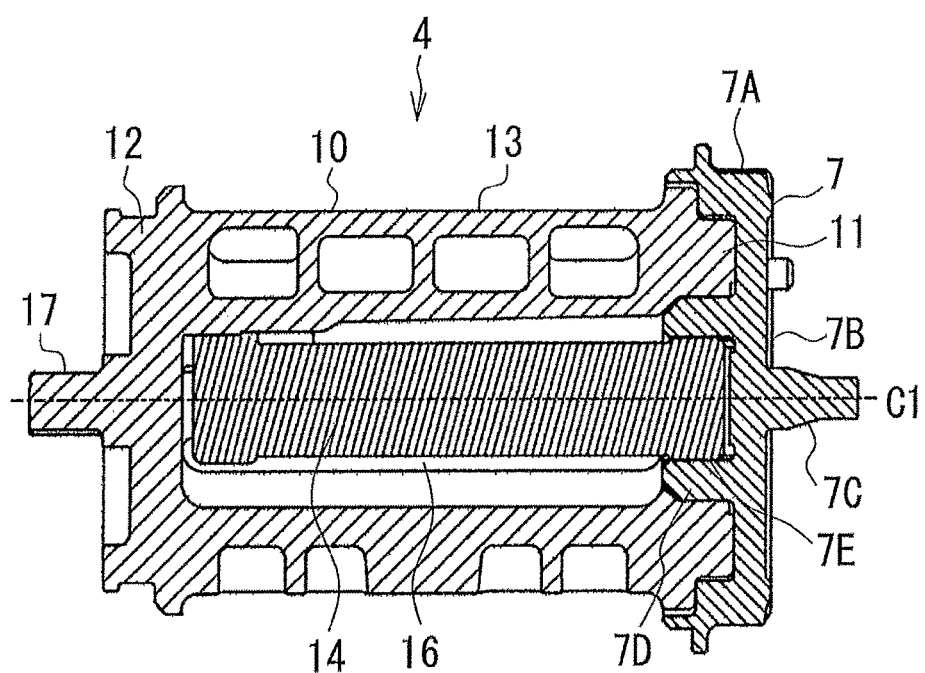
FIG. 10 is a cross-sectional view of a spool unit.

FIG. 10 is a cross-sectional view of the spool unit 4.

As illustrated, the spool unit 4 includes the ratchet gear 7, the spool 10, and a cylindrical torsion bar 14. The ratchet gear 7 includes a plurality of the ratchet teeth 7A formed on the entire outer circumference of the ratchet gear 7, a convex portion 7D projecting from the center of the ratchet gear 7 to a side of the spool 10, a mounting hole portion 7E that is formed in the convex portion 7D and into which the torsion bar 14 is inserted, and the shaft portion (ratchet shaft portion) 7C formed at the center of the ratchet gear 7.

The spool 10 includes a shaft hole portion 16 formed along the center line Cl and the shaft 17 formed at a center of the second end portion 12. The shaft hole portion 16 is closed at the second end portion 12 of the spool 10 and is opened at the first end portion 11 of the spool 10. The ratchet shaft portion 7C and the shaft 17 are located on the center line Cl of the spool 10, and the spool unit 4 is supported so as to be rotatable about the center line Cl.

"Torsion Bar"

The torsion bar 14 is non-rotatably attached to each of the spool 10 and the ratchet gear 7 and connects between the spool 10 and the ratchet gear 7.

The torsion bar 14 is made of steel, for example, and is inserted into the shaft hole portion 16 of the spool 10. One end portion of the torsion bar 14 is fixed to the second end portion 12 of the spool 10 in the shaft hole portion 16 in a mutually non-rotatable manner, and the other end portion of the torsion bar 14 is inserted into the mounting hole portion 7E of the ratchet gear 7 and is fixed to the convex portion 7D in a mutually non-rotatable manner. The ratchet gear 7 is mounted on the first end portion 11 of the spool 10 by being fixed to the torsion bar 14. Each of the end portions of the torsion bar 14 are mounted with caulking and so on, so as not to fall off the spool 10 and the ratchet gear 7, respectively. In a normal condition, the torsion bar 14 allows the ratchet gear 7 to rotate and stop along with the spool 10, and stops the rotation of the spool 10 when the ratchet gear 7 is stopped to rotate.

The torsion bar 14 is an energy absorption member, and absorbs a moving energy of a passenger in an emergency of a vehicle. When a passenger wearing the webbing 2 moves forward in a vehicle while the rotation of the ratchet gear 7 in the extracting direction P is stopped due to the pawl 9, a force (extracting load) is applied from the passenger to the webbing 2. The extracting load is a load that acts on the webbing 2 due to the movement of the passenger. When the extracting load on the webbing 2 exceeds a predetermined value, the torsion bar 14 is plastically deformed (here, torsionally deformed) due to a rotational torque acting on the spool 10 in the extracting direction P. The torsion bar 14 allows rotation of the spool 10 in the extracting direction P while being plastically deformed. Because of the plastic deformation of the torsion bar 14, the spool 10 rotates in the extracting direction P. This enables the webbing 2 to be extracted from the spool 10 to absorb the moving energy of the passenger.

Then, the locking operation of the above described retractor 100 of the first embodiment will be described.

Here, locking of extraction of the webbing due to sudden extraction of the webbing 2 and releasing the lock will be described.

Before starting the description, arrangement of the locking mechanism of the retractor 100 is described.

FIG. 11 is a cross-sectional view of the locking mechanism of the retractor 100 in an unlock state (normal condition).

In FIG. 11, the locking arm 40 is rotatably connected to the arm support portion 36 of the locking gear 30. A biasing force of the sensor spring 45 is acting on the locking arm 40 in a reverse direction (counterclockwise direction in the drawing) of the lock actuating direction (the direction indicated with the arrow L) around the arm support portion 36.

Since the locking arm 40 is biased by the sensor spring 45, the other end portion 42 abuts on the stopper 38 provided on the locking gear 30, and the one end portion 41 is maintained to be away from the clutch gear 52 of the clutch 50, that is, the clutch 50 is not connected with the locking gear 30.

Besides, in the unlock state illustrated in FIG. 11, the clutch 50 is biased by the return spring 19 in the retracting direction W, while the guide pin 9B of the pawl 9 (FIG. 6) is biased by the return spring 19 in a direction to move away from the ratchet gear 7 (FIG. 6) (unengaging direction). Thus, the guide pin 9B abuts on the illustrated lower end portion of the guide groove 56 of the clutch 50 while the pawl 9 is kept in the rest position and the clutch 50 is kept in the first position.

In this state, when the webbing 2 is extracted at an acceleration equal to or less than a predetermined value, the spool 10 and the locking gear 30 rotate in the extracting direction P. During this rotation, the clutch 50 does not rotate because the clutch 50 is not connected to the spool 10 and the locking gear 30, therefore the extraction of the webbing 2 is not locked, allowing the webbing 2 to be extracted freely.

On the other hand, when the webbing 2 is suddenly extracted at an acceleration higher than a predetermined value, causing an acceleration of rotation of the spool 10 in the extracting direction P to exceed a predetermined value, the locking arm 40 cannot follow the rotation of the spool 10 (and thus the locking gear 30) due to an inertia force. In other words, the one end portion 41 of the locking arm 40 is displaced in the lock actuating direction (the direction indicated with the arrow L) against the biasing force of the sensor spring 45 to engage with the clutch gear 52. This enables the clutch 50 to connect with the locking gear 30 (the spool 10 and the ratchet gear 7) rotating in the extracting direction P, and the clutch 50 thus rotates in the extracting direction P against the biasing force of the return spring 19 acting in the retracting direction W under the unlock state.

When the clutch 50 rotates in the extracting direction P, the guide pin 9B of the pawl 9 is forcibly guided by the illustrated lower edge of the guide groove 56 of the clutch 50 rotating about the center line C1 to move toward a center of the clutch 50 (the guide pin 9B rotates about a center line C2 (FIG. 4) of the mounting hole 29). Due to the rotation of the guide pin 9B, the engaging claw 9A of the pawl 9 engages with the ratchet teeth 7A of the ratchet gear 7 and locks the rotation of the ratchet gear 7. At the same time, the rotation of the spool 10 integrated with the ratchet gear 7 in the extracting direction P is prevented and the extraction of the webbing 2 is thus prevented.

Besides, in the above description, mechanisms to connect and disconnect the clutch 50 to and from the locking gear 30, including the locking arm 40 and the sensor spring 45 that connect and disconnect the clutch 50 to and from the locking gear 30 via rotation of the spool 10 in accordance with extraction and retraction of the webbing 2, are collectively referred to as a connecting mechanism. The connecting mechanism constitutes a part of the locking mechanism.

FIGS. 12 to 16 are cross-sectional views of the locking mechanism 8, illustrating a series of movements of the above-described retractor 100 of the first embodiment from the extraction of the webbing 2 to stopping of the extraction (from the unlock state to the lock state) together with the directions of the biasing forces of the return spring 19 and the directions of the rotational moments acting on the pawl 9 and the clutch 50.

Figure 12:
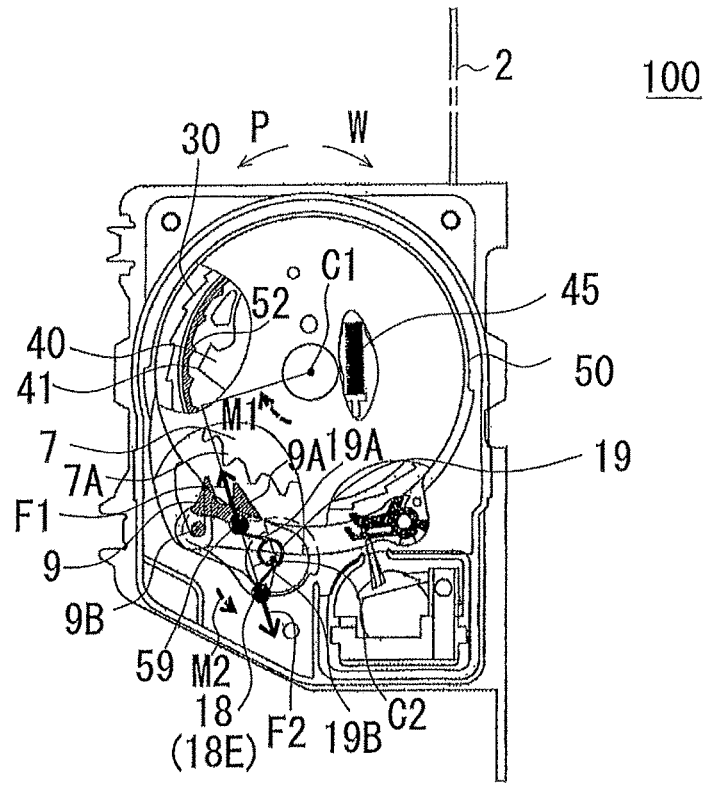
FIG. 12 is a fragmentary cross-sectional view of the retractor of the first embodiment in the unlock state.

That is, FIG. 12 is a cross-sectional view of the locking mechanism 8 wherein the spool is in a normal state, that is, the unlock state.

As described above, the first arm portion 19A of the return spring 19 is connected to the clutch 50 (attaching pin 59), and the second arm portion 19B is connected to the pawl 9 via the attaching pin 18E (FIG. 4) of the return plate 18. The return spring 19 applies a biasing force F1 to the attaching pin 59 of the clutch 50 by the first arm portion 19A and applies a biasing force F2 to the attaching pin 18E of the return plate 18 by the second arm portion 19B.

As is apparent from FIG. 12, due to the biasing force F1 of the return spring 19 acting on the attaching pin 59 of the clutch 50, a rotational moment M1 is generated around the center line C1, which is the center of rotation of the clutch 50. In the unlock state illustrated in FIG. 12, the rotational moment M1 is acting in the retracting direction W.

Also, the other end portion 42 of the locking arm 40 is maintained so as to abut on the stopper 38 due to the biasing from the sensor spring 45 (see FIG. 11).

Figure 13:
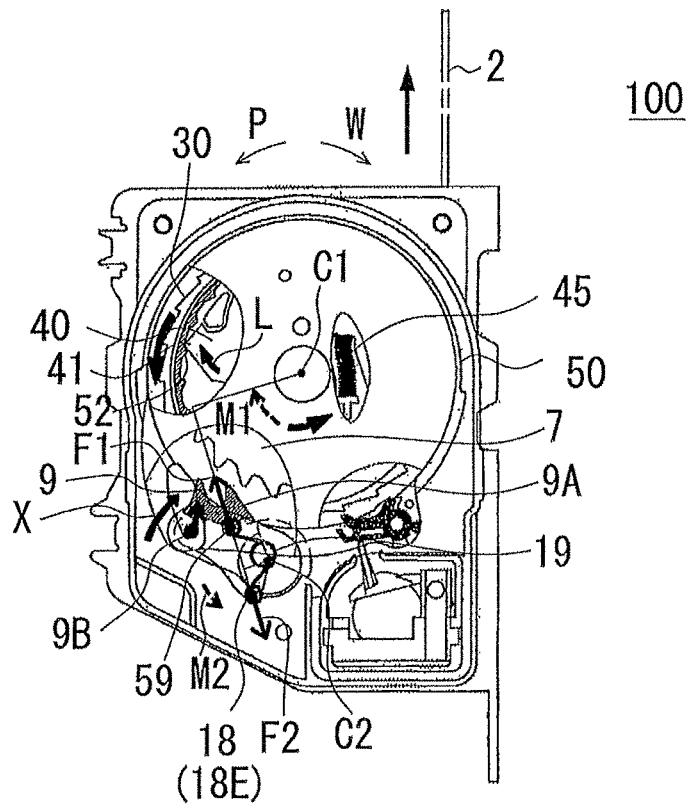
FIG. 13 is a fragmentary cross-sectional view of the retractor of the first embodiment in transition from the unlock state to a lock state.

Next, in an emergency of a vehicle, when the webbing 2 is suddenly extracted as illustrated in FIG. 13, causing the acceleration of extraction of the webbing 2 to exceed a predetermined value and the acceleration (acceleration of rotation) of the spool 10 rotating in the extracting direction P to exceed a predetermined value. Here, since the locking arm 40 is rotatably supported by the arm support portion 36 of the locking gear 30 as described with reference to FIG. 11, a delay occurs in the rotation of the locking arm 40 with respect to the rotation of the locking gear 30 due to inertia. That is, the locking arm 40 rotates about the arm support portion 36 while compressing the sensor spring 45 and, as illustrated with the arrow L, the one end portion 41 of the locking arm 40 moves outward in the radial direction of the locking gear 30 to engage with the clutch gear 52 of the clutch 50.

This enables the clutch 50 to connect to the locking gear 30 via the locking arm 40 and to rotate in the extracting direction P along with the locking gear 30 and the spool 10 against the biasing force F1 (rotational moment M1) of the return spring 19 acting in the retracting direction W.

Figure 14:
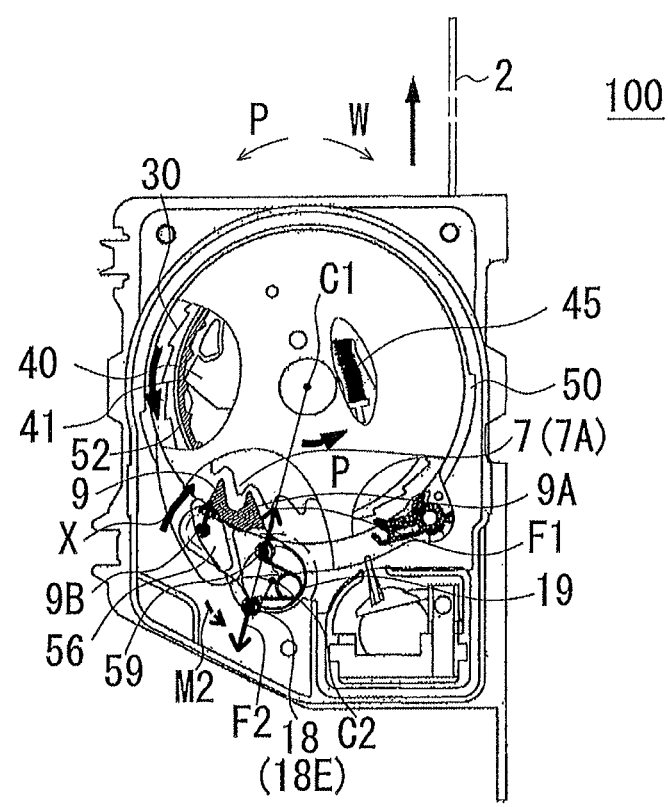
FIG. 14 is a fragmentary cross-sectional view of the retractor of the first embodiment in transition from the unlock state to the lock state.

When the clutch 50 rotates, the guide pin 9B of the pawl 9 is forcibly guided by the guide groove 56 of the clutch 50 against the biasing force of the return spring 19, as illustrated in FIG. 14, and rotates the engaging claw 9A of the pawl 9 in the engaging direction (illustrated with an arrow X) to engage the ratchet teeth 7A of the ratchet gear 7. In other words, due to the rotation of the clutch 50, the pawl 9 is rotated from the rest position toward the engaging position.

As the clutch 50 rotates due to the extraction of the webbing 2 and the pawl 9 rotates in the engaging direction, the pawl 9 and the return plate 18 rotate about the center line C2 of the mounting hole 29 (FIG. 4) of the first side wall 22 of the housing 3A.

As a result, the direction of the biasing force F1 of the return spring 19, that is, the direction of a line connecting the attaching pin 59 of the clutch 50 and the attaching pin 18E of the return plate 18 is changed. In other words, the rotational moment M1 acting on the clutch 50 around the center line C1 due to the biasing force F1 of the return spring 19 in the retracting direction W in the unlock state becomes smaller and to zero as illustrated in FIG. 14, while continuing to extract the webbing 2.

FIG. 14 shows a state in which the attaching pin 18E of the return plate 18, the attaching pin 59 of the clutch 50, and the center of rotation of the clutch 50 (a point on the center line C1) are aligned on a straight line. That is, in this state, the biasing force F1 acts in a direction toward the center of rotation of the clutch 50 and does not generate the rotational moment M1.

Subsequent to the state illustrated in FIG. 14, the direction of the rotational moment M1 acting on the clutch 50 around the center line C1 due to the return spring 19 is changed from the retracting direction W to the extracting direction P of the webbing 2.

Figure 15:
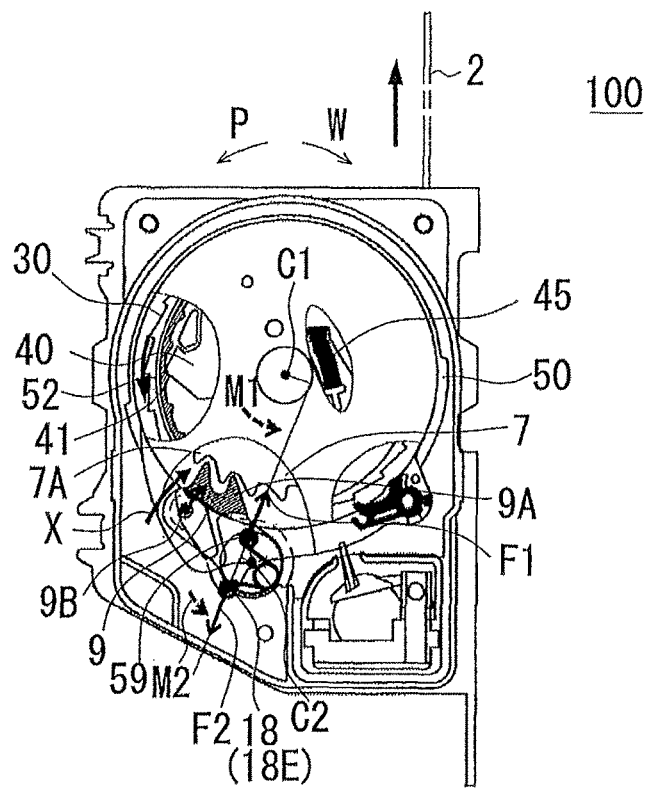
FIG. 15 is a fragmentary cross-sectional view of the retractor of the first embodiment in transition from the unlock state to the lock state.
Figure 16:
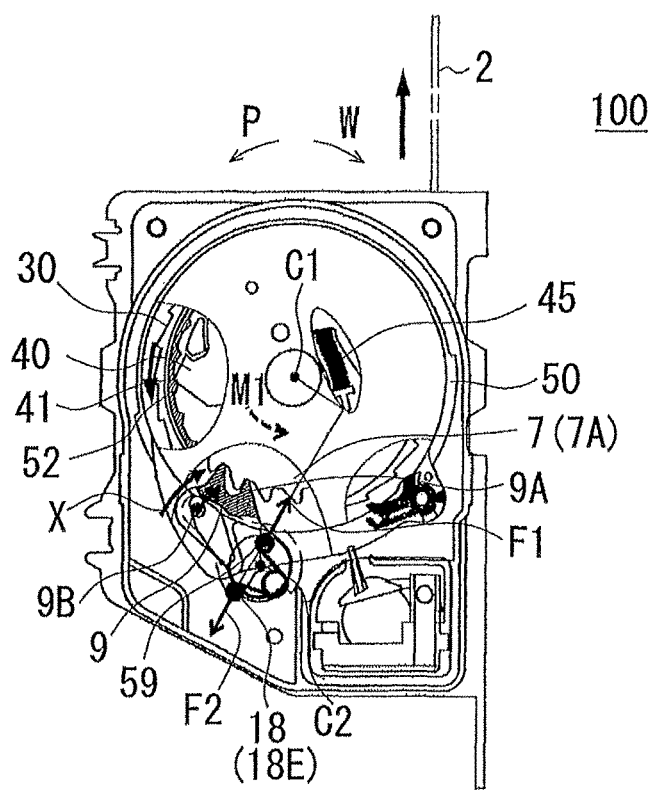
FIG. 16 is a fragmentary cross-sectional view of the retractor of the first embodiment including the locking mechanism in the lock state.

FIG. 15 illustrates the state in which the direction of the rotational moment M1 acting on the clutch 50 is changed from the retracting direction W to the extracting direction P in accordance with the extraction of the webbing 2 (rotation of the spool unit 4 in the extracting direction P), and FIG. 16 illustrates the lock state of the spool unit 4 (spool 10). That is, the pawl 9 is in engagement with the ratchet teeth 7A of the ratchet gear 7.

In the lock state, as illustrated in FIG. 16, the direction of the rotational moment M1 acting on the clutch 50 due to the return spring 19 is the extracting direction P.

On the other hand, due to the second arm portion 19B (FIG. 11) of the return spring 19, the biasing force F2 is acting on the attaching pin 18E of the return plate 18, and due to the biasing force F2, a rotational moment M2 around the center line C2 is acting on the pawl 9 via the guide pin 9B of the pawl 9 inserted into the through hole 18C of the return plate 18. As illustrated in FIGS. 12 to 16, the direction in which the rotational moment M2 acts on the pawl 9 is always a direction to rotate the pawl 9 about the center line C2 in the unengaging direction. That is, due to the rotational moment M2, a biasing force to rotate the clutch 50 in the retracting direction W is always acting on the guide groove 56 of the clutch 50.

The rotational moment M2 becomes smaller, however, as the pawl 9 is rotated from the rest position to the engaging position. In the state illustrated in FIG. 16 (lock state) in which the pawl 9 is in the engaging position, the rotational moment M2 is scarcely generated. This is because, as the pawl 9 is rotated from the rest position to the engaging position, a line connecting the attaching pin 59 of the clutch 50 and the guide pin 9B of the pawl 9 comes closer to the center of rotation of the pawl 9 (the point on the center line C2).

Accordingly, at least in the lock state illustrated in FIG. 16, regarding the biasing force acting on the clutch 50 by the return spring 19, the biasing force in the extracting direction P due to the rotational moment M1 becomes to be bigger than the biasing force in the retracting direction W due to the rotational moment M2.

That is, in the process of change of the rotational moment M1 from the state that the rotational moment M1 is zero illustrated in FIG. 14, to the lock state illustrated in FIG. 16, the rotational moment M1 gradually becomes larger in the extracting direction P, causing the biasing force in the extracting direction P due to the rotational moment M1 to be larger than the biasing force in the retracting direction W due to the rotational moment M2, and the direction of the biasing force acting on the clutch 50 by the return spring 19 is changed from the retracting direction W to the extracting direction P. Accordingly, in the lock state, the clutch 50 is biased by the return spring 19 in the extracting direction P, and because of this biasing force, the clutch 50 is maintained in the second position guiding the pawl 9 to the engaging position.

Next, in order to release the lock of rotation of the spool unit 4 (spool 10) in the extracting direction P due to the locking mechanism 8, a tensile force acting on the webbing 2 in the extracting direction P is required to be removed. When the tensile force acting on the webbing 2 in the extracting direction P is removed, the spool unit 4 (spool 10) and the locking gear 30 integrally attached to the ratchet gear 7 of the spool unit 4 rotate in the retracting direction W due to the biasing force of the spiral spring 70 (FIGS. 7A and 7B) of the winding spring unit 5.

Figure 17:
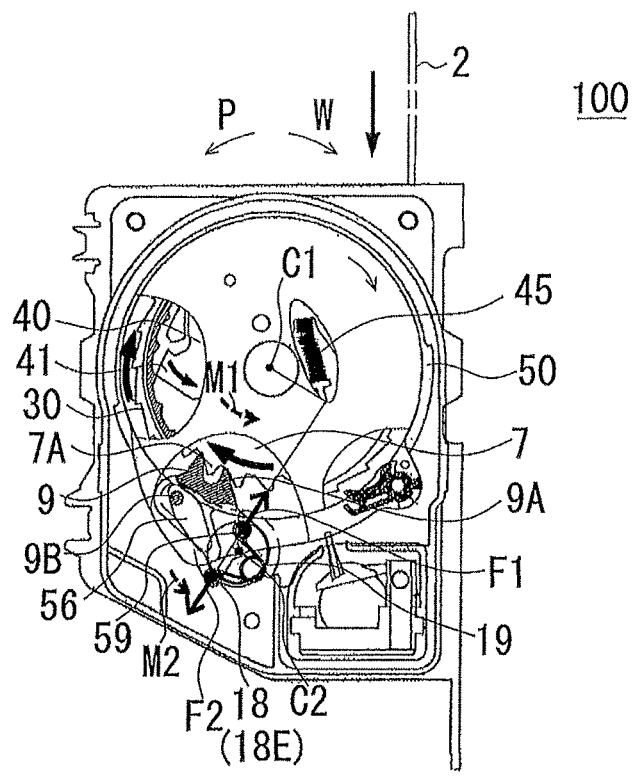
FIG. 17 is a fragmentary cross-sectional view of the retractor of the first embodiment in transition from the lock state to the unlock state.

FIG. 17 illustrates the state in which, due to the biasing force of the spiral spring 70 of the winding spring unit 5, the spool unit 4 slightly rotates in the retracting direction W and the webbing 2 is retracted for releasing the lock.

In this case, since the clutch 50 is biased by the return spring 19 in the extracting direction P and is maintained in the second position with the pawl 9 being guided to the engaging position, the clutch 50 does not rotate in the retracting direction W while the locking gear 30 slightly rotates in the retracting direction W.

When the amount of an angle of relative rotation between the locking gear 30 rotating in the retracting direction W and the clutch 50 at least reaches an amount of an angle of relative rotation required for disconnecting the one end portion 41 of the locking arm 40 from the clutch gear 52, the one end portion 41 of the locking arm 40 is rotated due to the biasing force of the sensor spring 45 to move away from the clutch gear 52 and the connection between the clutch 50 and the locking gear 30 is released.

On the other hand, as illustrated in FIG. 17, at the same time, or immediately after the connection between the clutch 50 and the locking gear 30 is released, the ratchet gear 7 rotates in the retracting direction W, to cause the engaging claw 9A of the pawl 9 to move away from a ratchet tooth 7A of the ratchet gear 7 with which the engaging claw 9A was in engagement and to abut on an inclined surface on a side of the retracting direction W of another ratchet tooth 7A located on a side of the extracting direction P of the ratchet tooth 7A.

Figure 18:
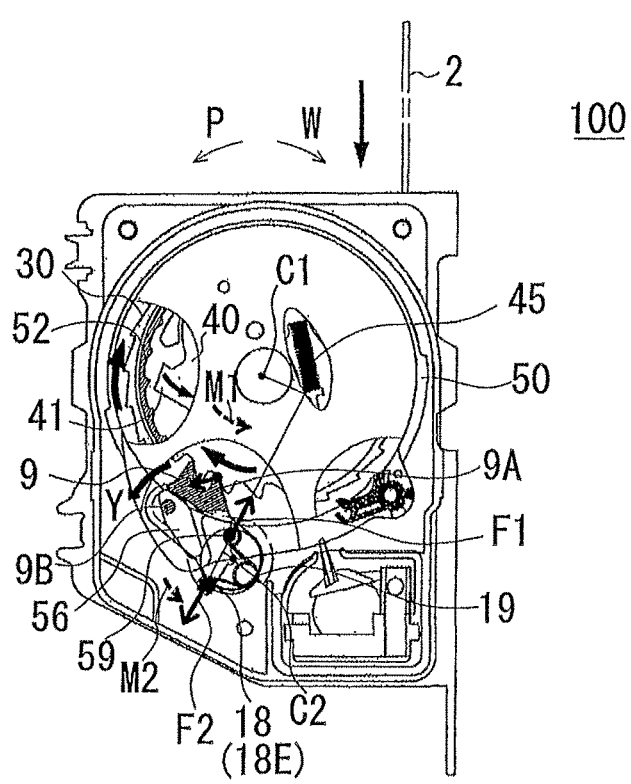
FIG. 18 is a fragmentary cross-sectional view of the retractor of the first embodiment in transition from the lock state to the unlock state.

Then, as illustrated in FIG. 18, as the spool unit 4 further rotates in the retracting direction W, the engaging claw 9A of the pawl 9 abuts on and is guided by the inclined surface in the retracting direction W of the another ratchet tooth 7A to be forcibly rotated in the unengaging direction (illustrated with an arrow Y). In conjunction with this rotation of the pawl 9 in the unengaging direction, the clutch 50 is started to rotate in the retracting direction W of the webbing 2 against the biasing force of the return spring 19 in the extracting direction P.

Figure 19:
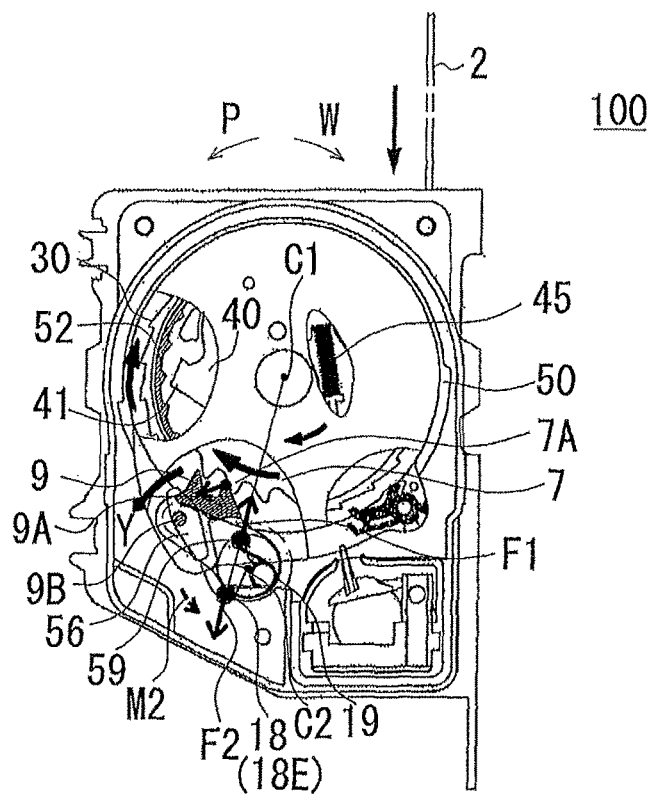
FIG. 19 is a fragmentary cross-sectional view of the retractor of the first embodiment in transition from the lock state to the unlock state.
Figure 20:
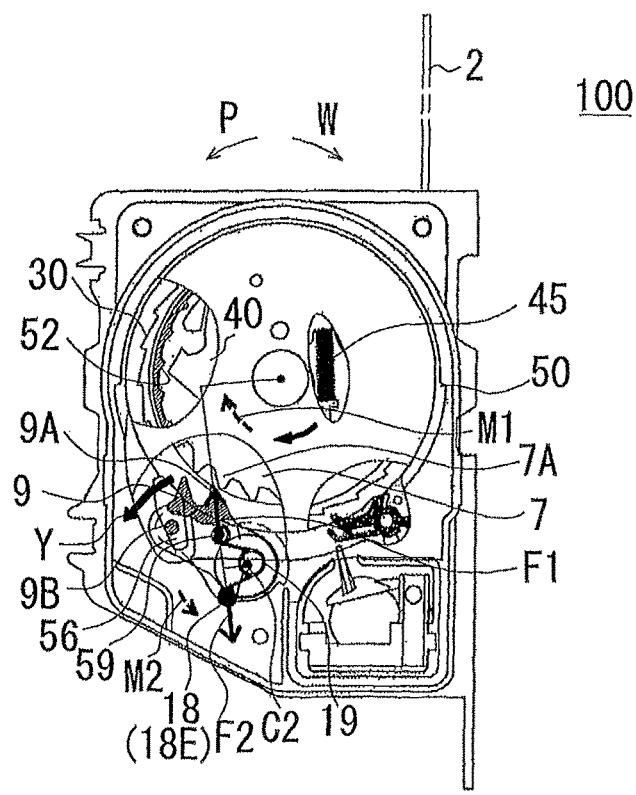
FIG. 20 is a fragmentary cross-sectional view of the retractor of the first embodiment in transition from the lock state to the unlock state.

Due to the rotation of the clutch 50 in the retracting direction W, the direction of the biasing force F1 due to the return spring 19, that is, the direction of the line connecting the attaching pin 59 of the clutch 50 and the attaching pin 18E of the return plate 18, is changed from the right side to the left side of the center line C1 of the rotation of the clutch 50, as illustrated in FIGS. 18 to 20, contrary to a direction change occurred in locked state.

That is, the rotational moment M1 acting on the clutch 50 due to the return spring 19 is changed from the extracting direction P to the retracting direction W of the webbing 2 of the clutch 50. Besides, FIG. 19 illustrates the state in which the attaching pin 59 of the clutch 50, the attaching pin 18E of the return plate 18, and the center of rotation of the clutch 50 (the point on the center line C1) are aligned on a straight line. In other words, in this state, the biasing force F1 acts in a direction toward the center of rotation of the clutch 50 and does not generate the rotational moment M1.

While the spool unit 4 continues further rotation in the retracting direction W as illustrated in FIG. 20, the direction of the rotational moment M1 switches from the extracting direction P to the retracting direction W, and the rotational moment M1 becomes larger as the spool unit 4 (clutch 50) rotates in the retracting direction W.

Figure 21:
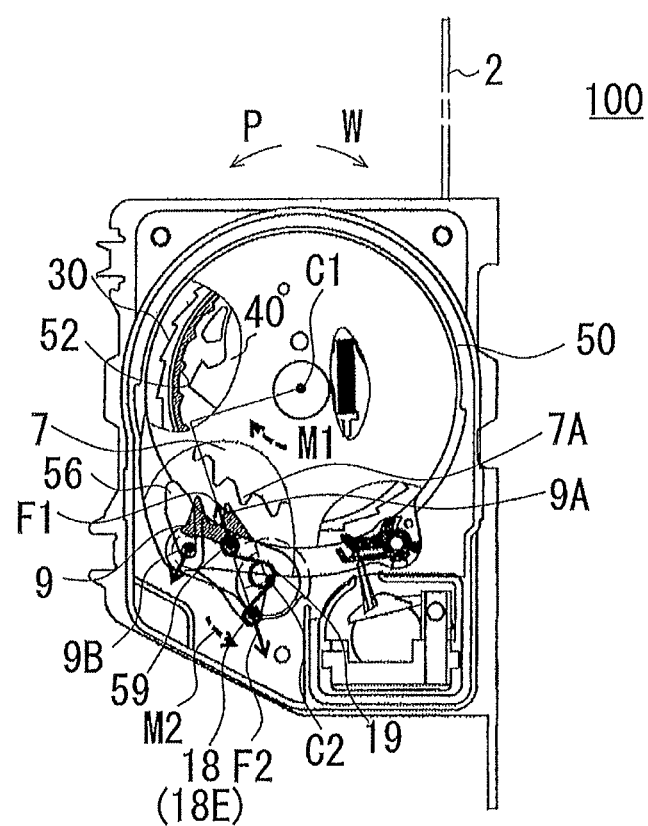
FIG. 21 is a fragmentary cross-sectional view of the retractor of the first embodiment in the unlock state.

Since the rotational moment acting on the clutch 50 around the center line C1 due to the return spring 19 is switched to the retracting direction W, the direction of the biasing force acting on the clutch 50 is changed to the retracting direction W, and after the biasing force in the retracting direction W becomes large to some extent, the clutch 50 is swiftly rotated in the retracting direction W due to the biasing force in the retracting direction W, and the guide pin 9B of the pawl 9 is guided in the guide groove 56 of the clutch 50 and quickly rotated in the unengaging direction to return to the unlock position. That is, as illustrated in FIG. 21, due to the biasing force of the return spring 19 in the retracting direction W, the pawl 9 returns to and is maintained in the unlock position, and the clutch 50 returns to and is maintained in the first position. After that, webbing 2 can be extracted and retracted freely.

That is, since the clutch 50 is biased by the return spring 19 in the extracting direction P in the lock state, the connection between the clutch 50 and the locking gear 30 can be released by retracting a smaller amount of the webbing after the lock releasing is started, in comparison with a conventional retractor in which the clutch is biased in the retracting direction W in the lock state. When releasing the lock, unlike the conventional retractor, this retractor permits a quick release of the lock by retracting a smaller amount of the webbing without requiring a relative rotation of the locking gear with the clutch to rotate the spool in the retracting direction of the webbing until the connection between the locking gear and the clutch is released, after the clutch restores the pawl to the rest position.

Also, as already described, due to the rotational moment M2 acting on the pawl 9 around the center line C2 by the second arm portion 19B of the return spring 19, a biasing force to rotate the clutch 50 in the retracting direction W is always acting on the guide groove 56 of the clutch 50 via the guide pin 9B of the pawl 9. Considering this fact, as illustrated in FIG. 19 at the moment when the rotational moment M1 becomes zero, the biasing direction of the clutch 50 by the return spring 19 is the retracting direction W.

This means that, in the process of change from the lock state illustrated in FIG. 16 to the condition illustrated in FIG. 19 where the rotational moment M1 becomes zero, the direction of the biasing force acting by the return spring 19 to the clutch 50 is changed from the extracting direction P to the retracting direction W. This enables to switch the direction of the biasing force acting by the return spring 19 to the clutch 50 to the retracting direction W as early as possible, thereby quickly release the lock.

In the unlock state, the pawl 9 is maintained in the unlock position by a biasing force acting on the attaching pin 18E of the return plate 18 in the retracting direction W due to the return spring 19, and the clutch 50 is maintained in the first position by a biasing force acting on the attaching pin 59 in the retracting direction W. Therefore, generation of noise due to rattling of the pawl 9 and the clutch 50 caused by vibration of a vehicle, for example, can be suppressed.

Also, in the state illustrated in FIG. 20, the tip of the engaging claw 9A of the pawl 9 is located on the arc of the tooth tip circle of the ratchet teeth 7A. Before reaching this state, the engaging claw 9A of the pawl 9 may be guided by the ratchet teeth 7A of the ratchet gear 7 rotating in the retracting direction W and forcibly rotated in the unengaging direction. That is, since the clutch 50 has already rotated to a position where the rotational moment M1 acts in the retracting direction W in the condition illustrated in FIG. 20, the rotational moment M1 can be reliably switched to the retracting direction W to release the lock when releasing the lock.

As described above, in the retractor of the present embodiment, the clutch 50 is biased by the return spring 19 in the extracting direction P of the webbing 2 in the lock state, that is, the state in which the pawl 9 is in the engaging position. Also, in the unlock state, that is, the state in which the pawl 9 is in the rest position, the clutch 50 is maintained in the first position because a biasing force acts on the attaching pin 59 in the retracting direction W due to the return spring 19. The members, such as the return spring 19, that bias the clutch 50 respectively in the extracting direction of the webbing 2 in the lock state and in the retracting direction of the webbing 2 in the unlock state, are herein collectively referred to as clutch biasing members.

(Second Embodiment)

A second embodiment of the present invention will now be described.

As with the first embodiment, the first arm portion 19A of the return spring 19 of a retractor 200 of the second embodiment is attached to the clutch 50 (attaching pin 59). The second arm portion 19B, however, is attached to an attaching pin 22A provided on the first side wall 22 of the housing 3A.

This is the difference between the retractor 100 of the first embodiment and the retractor 200 of the second embodiment. Thus, the return plate 18 used in the first embodiment is not used here. Except this difference, the retractor 200 is same as the retractor 100, also including the pawl 9 inserted into the mounting hole 29 of the first side wall 22 of the housing 3A and rotatably attached to the first side wall 22 with the pawl rivet 20.

Figure 22:
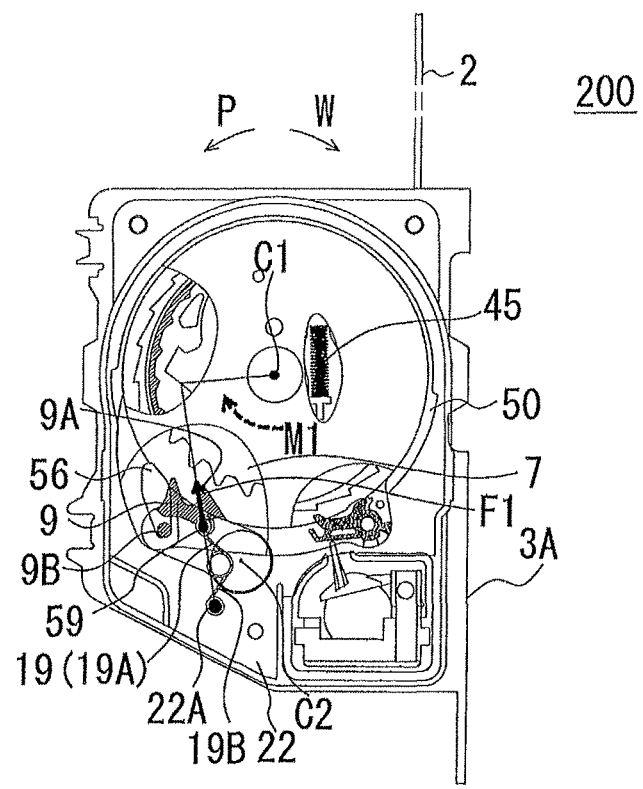
FIG. 22 is a fragmentary cross-sectional view of a retractor of a second embodiment in an unlock state.
Figure 23:
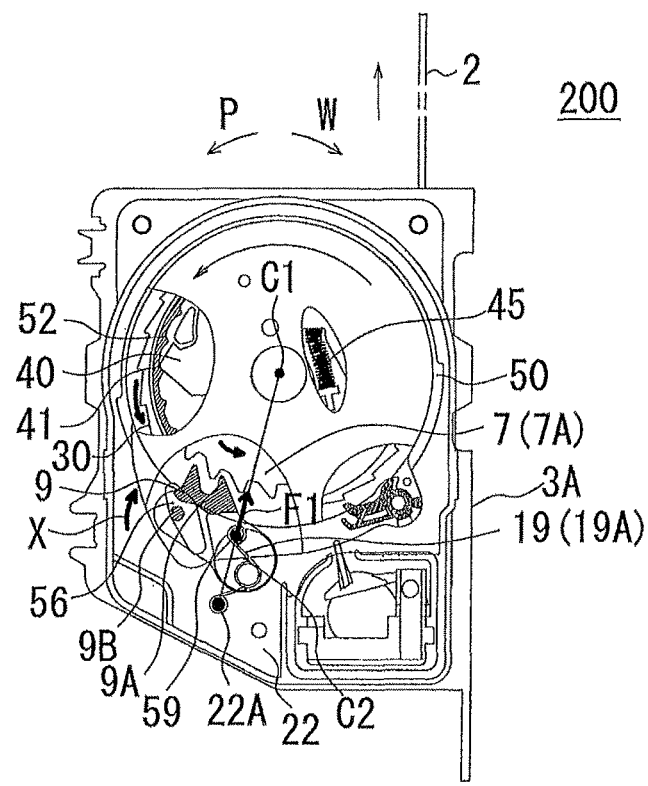
FIG. 23 is a fragmentary cross-sectional view of the retractor of the second embodiment in transition from the unlock state to a lock state.
Figure 24:
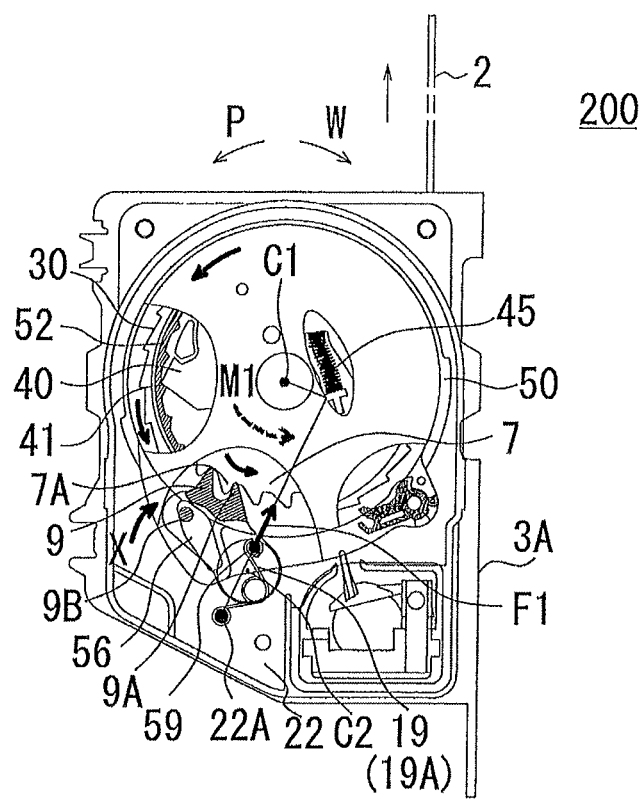
FIG. 24 is a fragmentary cross-sectional view of the retractor of the second embodiment in the lock state.

FIGS. 22 to 24 are drawings illustrating the direction in which the biasing force F1 caused by the return spring 19 acts and the direction of the rotational moment M1 acting on the clutch 50 in the series of actions in the retractor 200 from the unlock state to the lock state.

That is, FIG. 22 illustrates the state in which the spool is in a normal condition, that is, the unlock state.

The first arm portion 19A of the return spring 19 is connected to the attaching pin 59 of the clutch 50, and the second arm portion 19B is connected to the attaching pin 22A of the first side wall 22 of the housing 3A. In the unlock state, the clutch 50 is biased to rotate in the retracting direction W (clockwise direction in the drawing) via the first arm portion 19A. Accordingly, a biasing force acts on the pawl 9 via the guide groove 56 of the clutch 50 in a direction to move away from the ratchet gear 7 (unengaging direction).

As illustrated in FIG. 22, due to the biasing force F1 of the return spring 19 acting on the attaching pin 59 of the clutch 50, the rotational moment M1 around the center line C1 in the retracting direction W is generated on the clutch 50. The guide pin 9B of the pawl 9 is located at the illustrated bottom end of the guide groove 56 of the clutch 50. The pawl 9 is rotated to the rest position and the clutch 50 is maintained in the first position.

Also, the other end portion 42 of the locking arm 40 is maintained in a state to contact with the stopper 38 due to the biasing force by the sensor spring 45 (see FIG. 11).

Next, in an emergency of a vehicle, when the webbing 2 is suddenly extracted and the acceleration of the spool 10 rotating in the extracting direction P (acceleration of rotation) exceeds a predetermined value, the locking arm 40 rotates about the arm support portion 36 while compressing the sensor spring 45, as described with reference to FIG. 11, and the one end portion 41 of the locking arm 40 is displaced in the lock actuating direction (the direction indicated with the arrow L).

Next, when the one end portion 41 of the locking arm 40 engages with the clutch gear 52, the clutch 50 is connected to the locking gear 30 via the locking arm 40 and rotates together with the locking gear 30 (the spool 10 and the ratchet gear 7) in the extracting direction P against the biasing force of the return spring 19 in the retracting direction W of the webbing.

When the clutch 50 rotates in the extracting direction P, the pawl 9 rotates in the engaging direction. That is, due to the clutch 50 rotating in the extracting direction P, the pawl 9 rotates from the rest position toward the engaging position.

FIG. 23 illustrates the state in which the attaching pin 22A provided on the first side wall 22 of the housing 3A, the attaching pin 59 of the clutch 50, and the center of rotation of the clutch 50 (the point on the center line C1) are aligned on a straight line in the process of the rotation of the pawl 9 from the unlock position to the lock position due to the clutch 50 rotating in the extracting direction P. That is, in this state, the biasing force F1 acts in a direction toward the center of rotation of the clutch 50 and, similar to the condition illustrated in FIG. 14, the rotational moment M1 is not generated.

Subsequent to the condition illustrated in FIG. 23, as the clutch 50 further rotates in the extracting direction P and the pawl 9 rotates toward the engaging position, the direction of the rotational moment M1 acting on the clutch 50 due to the return spring 19 is changed from the retracting direction W to the extracting direction P, as with the first embodiment.

Thus, in the lock state, as illustrated in FIG. 24, the direction of the biasing force acting on the clutch 50 due to the return spring 19 is the extracting direction P of the webbing, and the clutch 50 is maintained in the second position by the clutch 50 biased by the return spring 19 in the extracting direction P in the lock state.

When releasing the lock by the locking mechanism 8, as with the first embodiment, the spool unit 4 (spool 10) and the locking gear 30 integrally attached to the ratchet gear 7 of the spool unit 4 rotate in the retracting direction W due to the biasing force of the spiral spring 70 of the winding spring unit 5 and the webbing 2 is retracted by removing the tensile force acting on the webbing 2.

Then, as with the first embodiment, because the clutch 50 is biased by the return spring 19 in the extracting direction P and is maintained in the second position with the pawl 9 being guided to the engaging position, the clutch 50 does not rotate in the retracting direction W and the locking gear 30 relatively rotates in the retracting direction W with respect to the clutch 50. When the amount of an angle of this relative rotation reaches an amount of an angle of relative rotation required for disconnecting the one end portion 41 of the locking arm 40 from the clutch gear 52, then the one end portion 41 of the locking arm 40 rotates due to the biasing force of the sensor spring 45 to move away from the clutch gear 52 and the connection between the clutch 50 and the locking gear 30 is released.

On the other hand, similar to the first embodiment, after the connection between the clutch 50 and the locking gear 30 is released, the engaging claw 9A of the pawl 9 is guided by the ratchet teeth 7A of the ratchet gear 7 rotating in the retracting direction W and forcibly rotated in the unengaging direction.

In conjunction with this rotation of the pawl 9 in the unengaging direction, the clutch 50 rotates in the retracting direction W of the webbing 2 against the biasing force of the return spring 19 in the extracting direction P.

Figure 25:
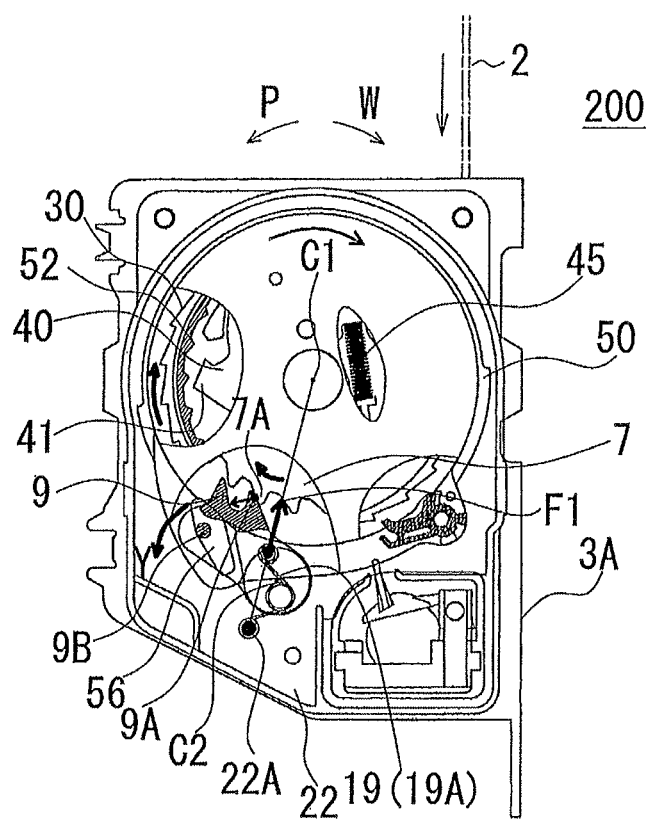
FIG. 25 is a fragmentary cross-sectional view of the retractor of the second embodiment in transition from the lock state to the unlock state.

Due to the rotation of the clutch 50 in the retracting direction W, the direction of the rotational moment M1 acting on the clutch 50 around the center line C1 due to the return spring 19 is changed from the extracting direction P to the retracting direction W of the webbing 2, contrary to a direction change in the locking operation. That is, after the biasing force F1 of the return spring 19 become to act in a direction toward the center of rotation of the clutch 50 and the rotational moment M1 acting on the clutch 50 becomes zero as illustrated in FIG. 25, the biasing direction of the clutch 50 is switched from the extracting direction P to the retracting direction W.

After the biasing force in the retracting direction W becomes large to some extent, the clutch 50 swiftly rotates in the retracting direction W due to the biasing force in the retracting direction W, the guide pin 9B is guided by the guide groove 56, the pawl 9 thereby quickly returns to the rest position, the clutch 50 restores to and is maintained in the first position, and returns to the normal state of the spool, that is, the unlock state illustrated in FIG. 22. After that, extraction and retraction of the webbing 2 becomes possible.

(Third Embodiment)

A third embodiment will now be described.

In a retractor 300 of the third embodiment, the first arm portion 19A of the return spring 19 is connected to an attaching pin 22B provided on the first side wall 22 of the housing 3A, and the second arm portion 19B is connected to the guide pin 9B of the pawl 9.

That is, unlike the retractor 200 of the second embodiment, in which one end portion of the return spring 19 is connected to the attaching pin 59 of the clutch 50, the first arm portion 19A of the return spring 19 of the retractor 300 of the third embodiment is connected to the attaching pin 22B provided on the first side wall 22 of the housing 3A. Also, although the return spring 19 of the retractor 200 of the second embodiment is a torsional coil spring, the return spring 19 of the retractor 300 of the third embodiment is a substantially V-shaped wire spring. Except these differences, the retractor 300 is the same as the retractor 200.

Figure 26:
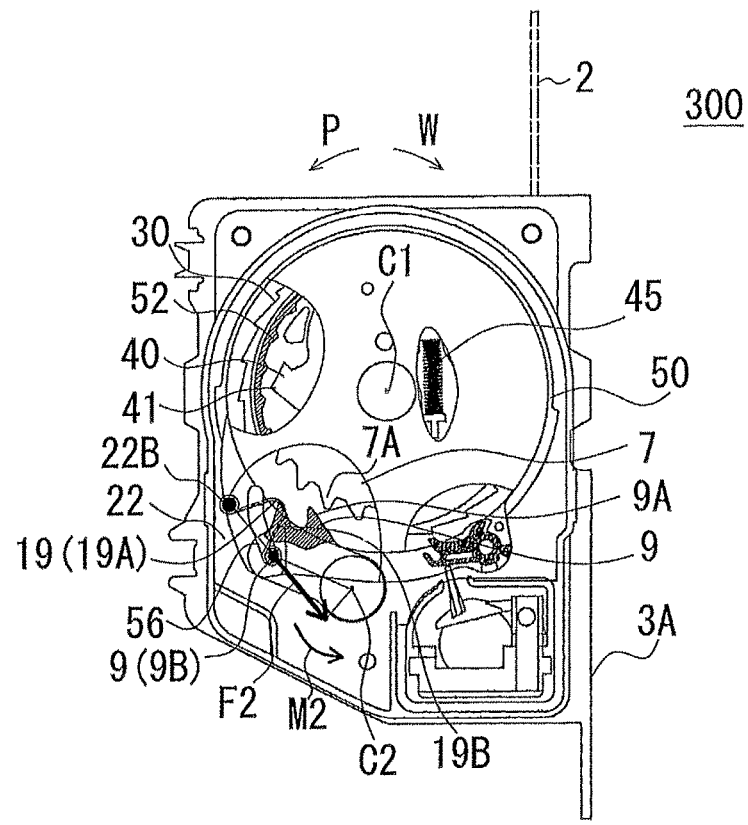
FIG. 26 is a fragmentary cross-sectional view of a retractor of a third embodiment in an unlock state.
Figure 27:
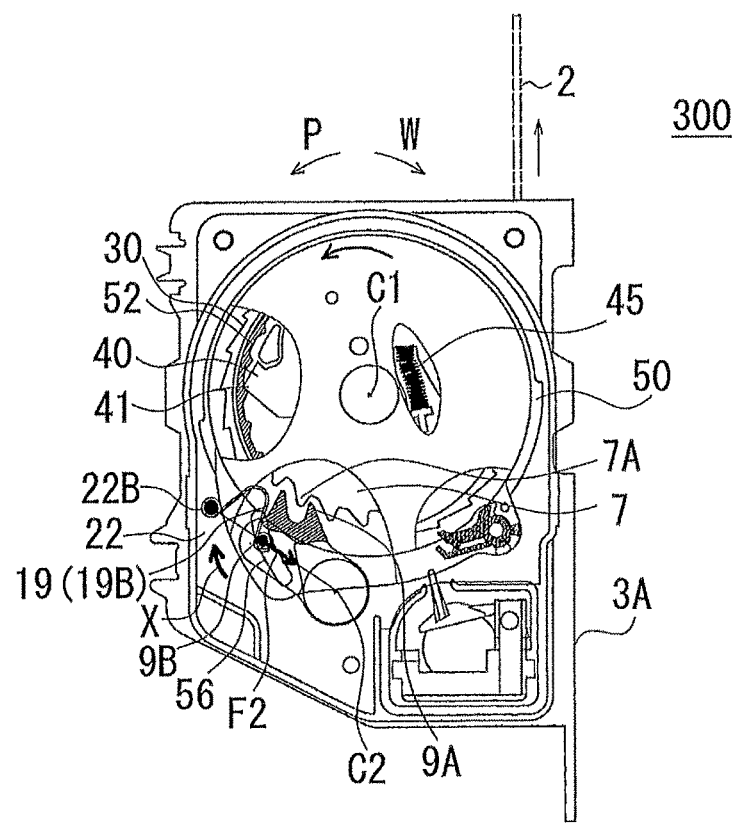
FIG. 27 is a fragmentary cross-sectional view of the retractor of the third embodiment in transition from the unlock state to a lock state.
Figure 28:
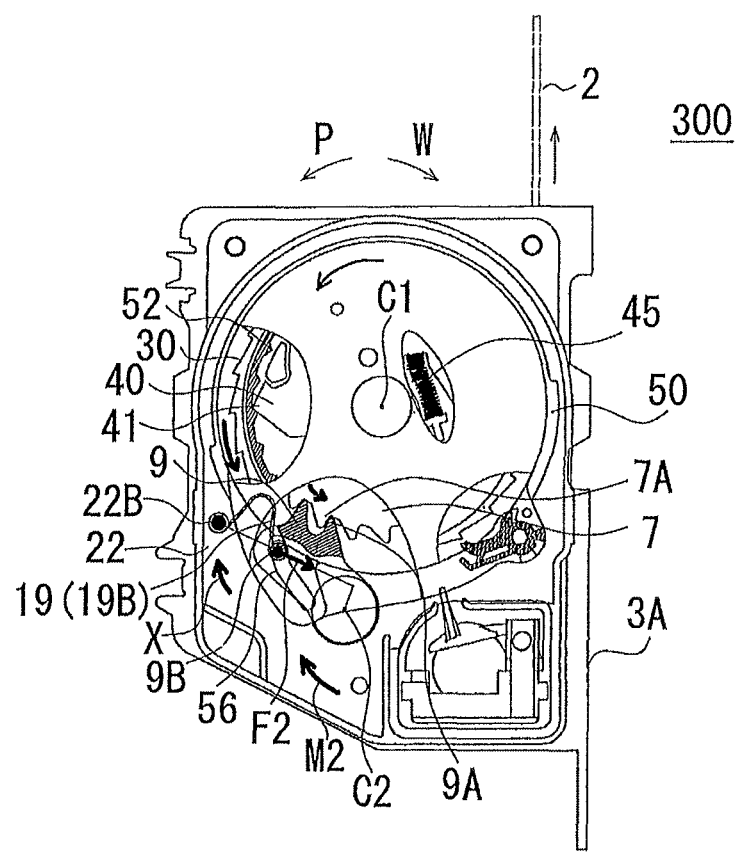
FIG. 28 is a fragmentary cross-sectional view of the retractor of the third embodiment in the lock state.

FIGS. 26 to 28 are drawings illustrating the direction in which the biasing force F2 by the return spring 19 acts and the direction of the rotational moment M2 by the biasing force acting on the pawl 9 in a process of actions in the retractor 300 of the third embodiment from the unlock state to the lock state.

That is, FIG. 26 illustrates the spool in a normal condition, that is, the unlock state.

The first arm portion 19A of the return spring 19 is connected to the attaching pin 22B of the first side wall 22 of the housing 3A, and the second arm portion 19B is connected to the guide pin 9B of the pawl 9. In the unlock state, the guide pin 9B of the pawl 9 is biased to rotate in the unengaging direction via the second arm portion 19B.

As illustrated in FIG. 26, due to the biasing force F2 of the return spring 19 acting on the guide pin 9B of the pawl 9, the rotational moment M2 around the center line C2 is acting on the pawl 9 in the unengaging direction, and the pawl 9 is biased to rotate in the unengaging direction. Thus, the clutch 50 is biased to rotate in the retracting direction W via the guide pin 9B of the pawl 9. Thus, the guide pin 9B of the pawl 9 is located at a bottom end of the guide groove 56 of the clutch and the pawl 9 is rotated to the rest position, while the clutch 50 is maintained in the first position.

Besides, in this case as well, the other end portion 42 of the locking arm 40 is maintained in contact with the stopper 38 due to the biasing force by the sensor spring 45 (see FIG. 11).

Next, in an emergency of a vehicle, when the webbing 2 is suddenly extracted and the acceleration of the spool 10 rotating in the extracting direction P (acceleration of rotation) exceeds a predetermined value, the locking arm 40 rotates about the arm support portion 36 while compressing the sensor spring 45, as described with reference to FIG. 11, and the one end portion 41 of the locking arm 40 is displaced in the lock actuating direction (the direction indicated with the arrow L).

Next, when the one end portion 41 of the locking arm 40 engages with the locking gear 30, the clutch 50 is connected to the locking gear 30 via the locking arm 40 and rotates with the locking gear 30 (the spool 10 and the ratchet gear 7) in the extracting direction P against the biasing force of the return spring 19 in the retracting direction W.

When the clutch 50 rotates, the pawl 9 rotates in the engaging direction against the biasing force of the return spring 19 in the retracting direction W. That is, due to the rotation of the clutch 50, the pawl 9 rotates from the rest position toward the engaging position.

FIG. 27 illustrates the state in which the attaching pin 22B on the first side wall 22 of the housing 3A, the guide pin 9B of the pawl 9, and the center of rotation of the pawl 9 (the point on the center line C2) are aligned on a straight line, that is, the state in which the biasing force F2 acts in a direction toward the center of rotation of the pawl 9 and the rotational moment M2 is not generated.

Subsequent to the state illustrated in FIG. 27, as the clutch 50 further rotates and the pawl 9 moves toward the engaging position, the direction of the rotational moment M2 acting on the pawl 9 due to the return spring 19 is changed from the unengaging direction to the engaging direction.

Accordingly, the direction of a biasing force acting on the guide groove 56 of the clutch 50 from the return spring 19 via the guide pin 9B of the pawl 9 is changed from the retracting direction W to the extracting direction P of the clutch 50.

That is, as with the first and second embodiments, while the clutch 50 starts to rotate and thereby the pawl 9 is moved toward the engaging position, the biasing force acting on the clutch 50 due to the return spring 19 is changed from the retracting direction W to the extracting direction P.

Thus, in the lock state, as illustrated in FIG. 28, the direction of the biasing force acting on the clutch 50 due to the return spring 19 is the extracting direction P, and the clutch 50 is biased to be maintained in the second position by the return spring 19 in the extracting direction P.

When releasing the lock of the spool 10 by the locking mechanism 8, as with the first and second embodiments, as the tensile force acting on the webbing 2 is removed, the spool unit 4 (spool 10) and the locking gear 30 integrally attached to the ratchet gear 7 of the spool unit 4 rotate in the retracting direction W due to the biasing force of the spiral spring 70 of the winding spring unit 5 and the webbing 2 is retracted.

Also, as with the first and second embodiments, the clutch 50 is biased by the return spring 19 in the extracting direction P and is maintained in the second position, the clutch 50 does not rotate in the retracting direction W and the locking gear 30 relatively rotates in the retracting direction W with respect to the clutch 50. When the amount of an angle of this relative rotation reaches the amount of an angle of relative rotation required for disconnecting the one end portion 41 of the locking arm 40 from the clutch gear 52, the one end portion 41 of the locking arm 40 rotates due to the biasing force of the sensor spring 45 to move away from the clutch gear 52 and to release the connection between the clutch 50 and the locking gear 30.

On the other hand, as with the first and second embodiments, after the connection between the clutch 50 and the locking gear 30 is released, the engaging claw 9A of the pawl 9 is guided by the ratchet teeth 7A of the ratchet gear 7 rotating in the retracting direction W and forcibly rotated in the unengaging direction against the biasing force of the return spring 19 in the engaging direction. In conjunction with this, the clutch 50 rotates in the retracting direction W.

Figure 29:
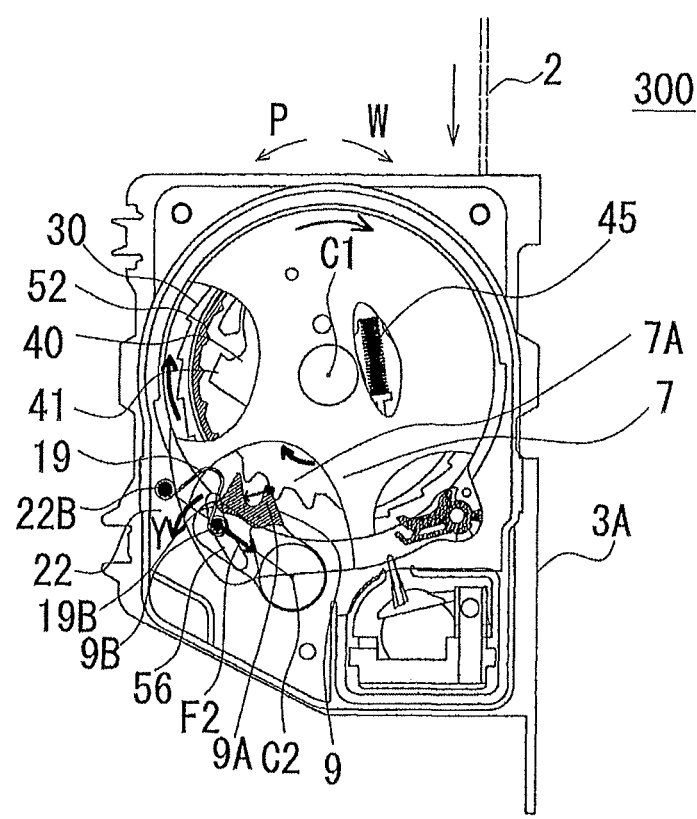
FIG. 29 is a fragmentary cross-sectional view of the retractor of the third embodiment in transition from the lock state to the unlock state.

Due to this rotation of the pawl 9 in the unengaging direction, the rotational moment M2 generated by the return spring 19 around the center line C2 is changed from the engaging direction to the unengaging direction of the pawl 9, contrary to a direction change in locked state. That is, after the biasing force F2 of the return spring 19 becomes to acts in a direction toward the center of rotation of the pawl 9 and the rotational moment M2 acting on the pawl 9 becomes zero as illustrated in FIG. 29, the biasing direction of the pawl 9 switches from the engaging direction to the unengaging direction. Accordingly, the biasing force acting on the guide groove 56 of the clutch 50 via the guide pin 9B of the pawl 9 also is changed from the extracting direction P to the retracting direction W.

After the biasing force in the retracting direction W becomes large to some extent, the pawl 9 swiftly rotates in the unengaging direction due to the biasing force in the unengaging direction to return to and be maintained in the rest position. In conjunction with this rotation of the pawl 9, the clutch 50 quickly rotates in the retracting direction W to restore to the first position, to return to the normal condition, that is, the unlock state illustrated in FIG. 26. After that, extraction and retraction of the webbing 2 becomes possible.

As described above, in the third embodiment, the pawl is biased to rotate in the engaging direction while in the engaging position and is biased to rotate in the unengaging direction while in the rest position. The members for biasing to rotate are herein collectively referred to as pawl biasing members. That is, in the third embodiment, the return spring 19 is both the clutch biasing member and the pawl biasing member.

In the second and third embodiments described above, because the clutch 50 is biased by the return spring 19 in the extracting direction P in the lock state as with the first embodiment, the connection between the clutch 50 and the locking gear 30 can be released by retracting a smaller amount of the webbing after unlock is started, in comparison with a conventional retractor in which the clutch is biased in the retracting direction W in the lock state. When releasing the lock, unlike the conventional retractor, the retractors of the embodiments permit a quick release of the lock by retracting a smaller amount of the webbing without requiring a relative rotation of the locking gear with the clutch to rotate the spool in the retracting direction of the webbing until the connection between the locking gear and the clutch is released, after the clutch restores the pawl to the rest position.

Regarding the locking operation of the first to third embodiments, a description has been provided on the case where the acceleration of rotation of the spool 10 in the extracting direction due to the sudden extraction of the webbing 2 is detected and the one end portion 41 of the locking arm 40 engages with the clutch gear 52 of the clutch 50, causing the clutch 50 to connect to the locking gear 30 to actuate the locking mechanism 8. Next, a description will be provided on the case where, in an emergency of a vehicle, the acceleration of the vehicle is detected by the acceleration sensor 15 to actuate the locking mechanism 8.

That is, in the first embodiment, when the acceleration of a vehicle exceeds a predetermined value in an emergency of the vehicle (such as collision and sudden braking), the inertia mass 15B of the acceleration sensor 15 in the unlock state illustrated in FIG. 12 moves on the sensor holder 15A due to an inertia force of the inertia mass 15B to push the sensor lever 15C upward. In other words, the acceleration sensor 15 detects the acceleration of the vehicle by the movement of the inertia mass 15B to move the lock claw 15D of the sensor lever 15C upward.

When the lock claw 15D moves upward, the meshing pawl 60 of the clutch 50 is pushed upward by the lock claw 15D to engage with the teeth 34 of the ratchet wheel 35. FIG. 30 illustrates a modification of the retractor of the first embodiment in this state. That is, the meshing pawl 60 of the clutch 50 engages with the teeth 34 of the ratchet wheel 35, to make the clutch 50 connect to the locking gear 30. In other words, in this case, the connecting mechanism for connecting and disconnecting the clutch 50 to and from the locking gear 30 includes the meshing pawl 60 of the clutch.

Next, when the webbing 2 is extracted, the clutch 50 rotates in the extracting direction P along with the locking gear 30 and the spool 10 against the biasing force of the return spring 19 in the retracting direction W with the meshing pawl 60 being engaged with the teeth 34.

Figure 31:
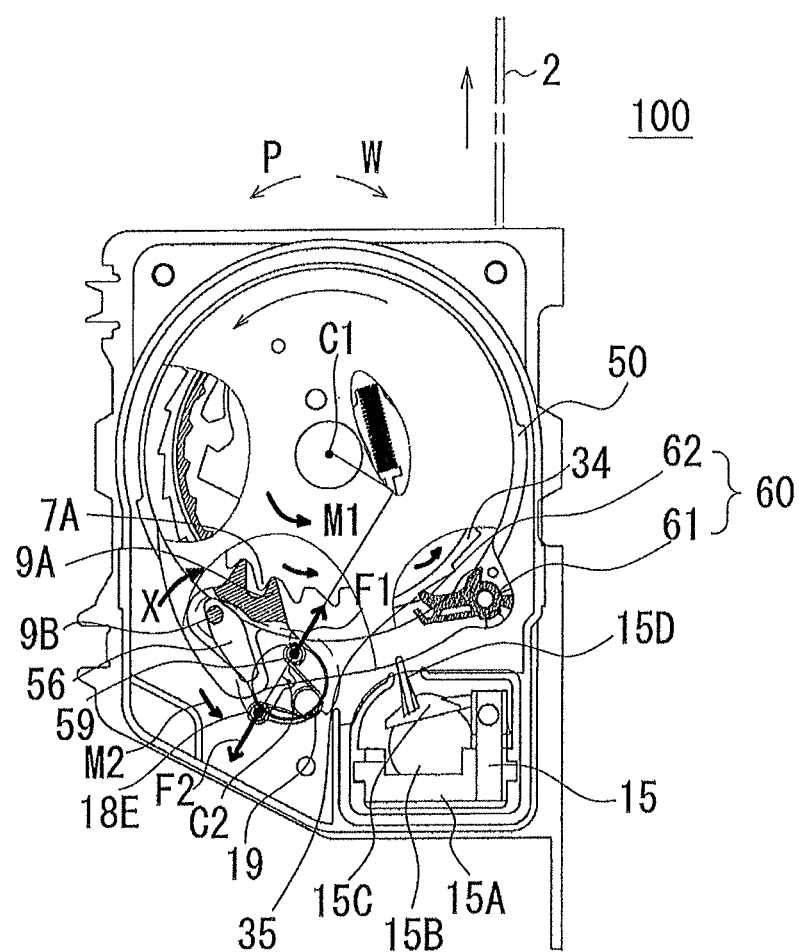
FIG. 31 is a fragmentary cross-sectional view of the variation of the retractor of the first embodiment in transition from the unlock state to a lock state.

When the clutch 50 rotates in the extracting direction P, the guide pin 9B of the pawl 9 is guided by the guide groove 56 of the clutch 50, so that the pawl 9 moves to the engaging position to engage with the ratchet gear 7. In other words, due to the rotation of the clutch 50, the pawl 9 moves from the rest position toward the engaging position and the engaging claw 9A of the pawl 9 engages with the ratchet teeth 7A. FIG. 31 illustrates this lock state.

Besides, during the rotation of the clutch 50 in the extracting direction P, the meshing of the meshing pawl 60 with the teeth 34 of the ratchet wheel 35 is maintained and, as already described, the direction of the biasing force acting on the clutch 50 due to the return spring 19 is changed from the retracting direction W to the extracting direction P. That is, in the lock state illustrated in FIG. 32, the clutch 50 is biased by the return spring 19 in the extracting direction P and is maintained in the second position.

The locking operation of the locking mechanism 8 utilizing the acceleration sensor 15 that detects the acceleration of a vehicle in an emergency of the vehicle is similar in modifications of the second and third embodiments as well.

Thus, the description of the modification of the first embodiment is applied for modifications of the second and third embodiments by analogy.

Also, the lock state due to this engagement between the pawl 9 and the ratchet gear 7 is released in accordance with similarly procedure to that already described in the first to third embodiments in connection with the case where the locking mechanism 8 is actuated due to the sudden extraction of the webbing 2.

Figure 32:
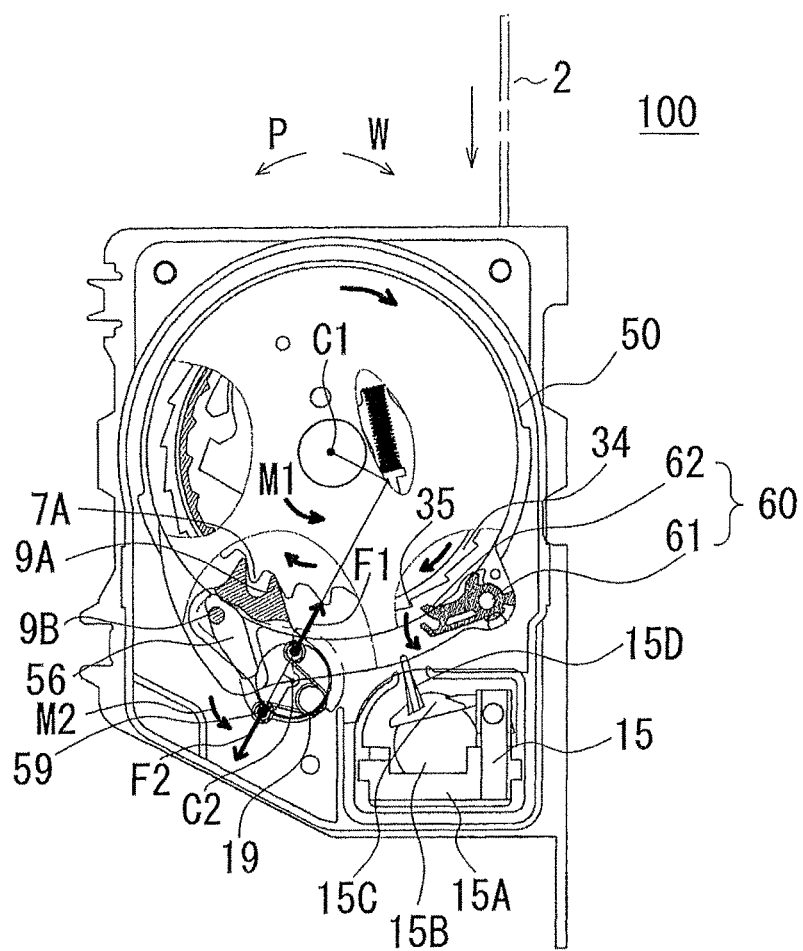
FIG. 32 is a fragmentary cross-sectional view of the variation of the retractor of the first embodiment in the lock state.

That is, in the state illustrated in FIG. 32, even if the locking gear 30 rotates in the retracting direction W due to the biasing force of the spiral spring 70 of the winding spring unit 5 when the lock of extraction of the webbing is released, the clutch 50 does not rotate in the retracting direction W because the clutch 50 is biased by the return spring 19 in the extracting direction P and is maintained in the second position. Thus, the locking gear 30 relatively rotates in the retracting direction with respect to the clutch 50. When the amount of the angle of the relative rotation angle reaches the amount of the angle of relative rotation required for the meshing pawl 60 of the clutch 50 to disengage from the teeth 34 of the ratchet wheel 35, then the meshing pawl 60 of the clutch 50 rotates in a downward direction in the drawing due to its own weight to move away from the clutch gear 52 and the connection between the clutch 50 and the locking gear 30 is thus released. After that, the lock is released in accordance with similarly procedure to that already described above with respect to the case where the locking mechanism 8 is actuated due to the sudden extraction of the webbing 2 in the first to third embodiments. That is, in case of the first embodiment, the lock is subsequently released as illustrated in FIGS. 19 to 21.

Thus, the descriptions of the first to third embodiments are cited here.

Also in the above described case where in an emergency of a vehicle an acceleration of the vehicle is detected by the acceleration sensor 15 to actuate the locking mechanism 8, the clutch 50 is biased by the return spring 19 in the extracting direction P in the lock state, as with the case where an acceleration of rotation of the spool 10 in the extracting direction due to sudden extraction of the webbing 2 is detected to actuate the locking mechanism 8. Thus, in comparison with a conventional retractor in which the clutch is biased in the retracting direction W in the lock state, the connection between the clutch 50 and the locking gear 30 can be released by retracting a smaller amount of the webbing after releasing the lock is started. When releasing the lock, unlike the conventional retractor, this retractor permits a quick release of the lock by retracting a smaller amount of the webbing without requiring a relative rotation of the locking gear with the clutch to rotate the spool in the retracting direction of the webbing until the connection between the locking gear and the clutch is released, after the clutch restores the pawl to the rest position.

REFERENCE SYMBOLS

100, 200, 300 retractor
2 webbing
3 housing unit
3A housing
4 spool unit
5 winding spring unit
6 locking unit
7 ratchet gear
7A ratchet teeth
7B ratchet base
8 locking mechanism
9 pawl
10 spool
11 first end portion
12 second end portion
13 wind-up portion
14 torsion bar
15 acceleration sensor
16 shaft hole portion
17 shaft
18 return plate
19 return spring
20 back wall
21 first side wall
22 second side wall
23 fixing plate
24 first opening
25A pawl storage portion
26 second opening
30 locking gear
35 ratchet wheel
36 arm support portion
37 support pin
38 stopper
39 sensor cover
40 locking arm
41 one end portion
45 sensor spring
46 protector
48 mechanism cover
48A first housing portion
48B second housing portion
48C bearing boss
48D through hole
50 clutch
51 inner wall
52 clutch gear
53 outer wall
54 center hole
55 guide portion
56 guide groove
57 meshing pawl support portion
58 stopper
59 meshing pawl
60 attaching portion
61 meshing claw
62 spiral spring
63 spring case
64 spring seat
65 spring shaft
74 fixing portion 75 concave portion
76 bearing hole
77 pin
W retracting direction
P extracting direction

What is claimed is:

1. A seatbelt retractor comprising:
a housing having a pair of side walls opposing each other;
a spool rotatably housed between the pair of side walls and to which one end of a webbing is fixed, the spool being biased to rotate in a retracting direction of the webbing by a retractive biasing member and being rotatable in an extracting direction of the webbing due to extraction of the webbing; and
a locking mechanism to prevent rotation of the spool in the extracting direction in response to an acceleration of a vehicle or an acceleration of extraction of the webbing in an emergency,
the locking mechanism comprising:
a ratchet gear provided at one end portion of the spool to integrally rotate with the spool;
a pawl rotatably supported by one of the pair of side walls and being displaceable between an engaging position where the pawl is engaged with teeth of the ratchet gear and can prevent rotation of the spool in the extracting direction and a rest position where the pawl is disengaged from the ratchet gear and allows rotation of the spool in the extracting direction, the pawl rotating in an engaging direction to the engaging position and rotating in an unengaging direction to the rest position,
a locking gear being non-rotatably and coaxially attached to the ratchet gear, thereby integrally rotating with the spool;
a clutch arranged coaxially and relatively rotatable with the spool, and arranged, in an emergency of the vehicle, to rotate integrally with the locking gear rotating in the extracting direction to displace the pawl to the engaging position; and
a connecting mechanism detecting an emergency of the vehicle to connect the clutch integrally and rotatably with the locking gear,
wherein due to rotation of the spool in the extracting direction while the clutch is connected to the locking gear, the clutch is rotated in the extracting direction to displace the pawl to the engaging position to prevent the rotation of the spool in the extracting direction, and
due to rotation of the spool in the retracting direction from a state where the pawl prevents the rotation of the spool in the extracting direction, the clutch is rotated in the retracting direction and the pawl returns to the rest position,
wherein the locking mechanism further includes
a clutch biasing member biasing to rotate the clutch in the retracting direction when the pawl is in the rest position and biasing to rotate the clutch in the extracting direction when the pawl is in the engaging position,
due to rotation of the spool in the extracting direction after the clutch and the locking gear are connected, a direction of biasing to rotate the clutch by the clutch biasing member is switched to the extracting direction,
the connection between the clutch and the locking gear via the connecting mechanism is released by relative rotation of the ratchet gear in the retracting direction with respect to the clutch while the clutch biasing member is biasing to rotate the clutch in the extracting direction, and
after the connection between the clutch and the locking gear is released, the direction of biasing to rotate the clutch by the clutch biasing member is switched to the retracting direction due to rotation of the spool in the retracting direction.

2. The seatbelt retractor according to claim 1, wherein
the clutch is located in a first position when the pawl is in the rest position and is located in a second position when the pawl is in the engaging position,
the clutch rotates between the first position and the second position in conjunction with the pawl,
the connection between the clutch and the locking gear via the connecting mechanism is released by relative rotation of the ratchet gear in the retracting direction with respect to the clutch due to rotation of the spool in the retracting direction while the clutch is located in the second position, and
due to further rotation of the spool in the retracting direction, the ratchet gear rotating in the retracting direction rotates the clutch in the retracting direction via the pawl, thereby the direction of biasing to rotate the clutch by the clutch biasing member is switched from the extracting direction to the retracting direction.

3. The seatbelt retractor according to claim 1, wherein
one end side of the clutch biasing member is attached to the clutch and the other end side of the clutch biasing member is attached to the pawl.

4. The seatbelt retractor according to claim 3, wherein
a direction of biasing to rotate the clutch by the one end side of the clutch biasing member is switched between the retracting direction and the extracting direction due to rotation of the clutch,
the other end side of the clutch biasing member biases to rotate the clutch in the retracting direction by constantly biasing the pawl toward the rest position, and
at least in a state where the pawl is in the engaging position, a biasing force to rotate the clutch by the one end side of the clutch biasing member in the extracting direction is larger than a biasing force to rotate the clutch by the other end side of the clutch biasing member in the retracting direction.

5. The seatbelt retractor according to claim 1, wherein
one end side of the clutch biasing member is attached to the clutch and the other end side of the clutch biasing member is attached to one of the side walls of the housing.

6. The seatbelt retractor according to claim 2, wherein
one end side of the clutch biasing member is attached to the pawl and the other end side of the clutch biasing member is attached to the housing, the clutch biasing member biasing to rotate the clutch via the pawl.

* * * * *